(12) United States Patent
Miyoshi et al.

(10) Patent No.: US 7,180,616 B2
(45) Date of Patent: Feb. 20, 2007

(54) PRINTING SYSTEM AND PRINTING METHOD USING THE PRINTING SYSTEM

(75) Inventors: Takahiro Miyoshi, Kawasaki (JP); Kenji Iga, Kawasaki (JP); Kenji Sawada, Kawasaki (JP); Shinichi Takahashi, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 934 days.

(21) Appl. No.: 09/769,530

(22) Filed: Jan. 26, 2001

(65) Prior Publication Data

US 2001/0049703 A1 Dec. 6, 2001

(30) Foreign Application Priority Data

Jun. 5, 2000 (JP) ............................. 2000-166981

(51) Int. Cl.
*G06F 3/12* (2006.01)
*G06F 15/00* (2006.01)
*G06K 1/00* (2006.01)

(52) U.S. Cl. ..................... 358/1.15; 358/1.1; 358/1.16; 709/201; 709/203

(58) Field of Classification Search ............... 358/1.15, 358/1.16

See application file for complete search history.

(56) References Cited

U.S. PATENT DOCUMENTS 5,956,487 A * 9/1999 Venkatraman et al. ...... 709/218
6,160,629 A * 12/2000 Tang et al. .................. 358/1.1
6,256,669 B1 * 7/2001 Hurwitz ...................... 709/224
6,791,703 B1 * 9/2004 Maeda et al. .............. 358/1.15

FOREIGN PATENT DOCUMENTS

JP 11-249844 9/1999

* cited by examiner

*Primary Examiner*—Twyler Lamb
*Assistant Examiner*—Yixing Qin
(74) *Attorney, Agent, or Firm*—Westerman, Hattori, Daniels & Adrian, LLP.

(57) ABSTRACT

It is an exemplified object of the present invention to provide a printing system for printing a Web page and printing method using the printing method that can initiates printing without requiring long wait after a print command is transmitted. The printing method as one exemplified embodiment of the present invention comprises the steps of: a computer creating a print control number and print format information of a Web page that is provided from a WWW server, wherein the computer including a WWW browser through the Web page is viewed and monitored; the computer transmitting to a printer connected to the computer print information that includes the print control number and the print format information; the printer converting data of the Web page into imaging data; the printer storing the print control number and the imaging data in a memory in the printer; and in response to a print execution command from the computer, the printer printing specific imaging data corresponding to a specific print control number, wherein the specific imaging data is specified by the print execution command among the imaging data stored in the memory.

14 Claims, 20 Drawing Sheets

PRINTING SYSTEM AND PRINTING METHOD USING THE PRINTING SYSTEM

BACKGROUND OF THE INVENTION

The present invention relates generally to printing systems, and printing method using the printing systems, and particularly to a printing system and printing method using the printing system for printing a Web page on the Internet. The "Web page" is made up of characters, images, movies, sounds, and other data files, displayed by a World Wide Web (WWW) browser, and composed/described in Hyper Text Markup Language (HTML).

Among printers suitable for the inventive printing system is, for example, a page printer. The "page printer" is a printer that composes a full page of data before printing the page. Print data is transmitted between a host computer and the page printer typically using a page description language (PDL), which is a kind of programming languages. The most page printers may also support several printer control codes (PCCs) in order to maintain compatibility with old application programs. The page printer includes a CPU and a memory, and a PDL or PCC received from the host computer is converted into an image in the CPU and temporarily stored in the memory, and then printed out.

Although a description will be given of the page printer as an exemplified embodiment of the present invention, printers other than the page printer such as a line printer and a serial printer are not precluded from application of the present invention. The present invention is suitable for a printing system provided with a local area network (LAN) interface connectible with the Internet via a router or the like, and the page printer.

The Internet is a global network environment consisting of some interlinked basic networks. Through the Internet, e-mails are exchanged, Web pages are published using the distributed information system called WWW, discussions are delivered via newsgroup services, and files are distributed via file transfer protocol (FTP) services.

Such information providing services utilizing the Internet have been rapidly penetrating in recent years into society in general. Users may search and browse Web page information on the Internet using a WWW browser such as the Internet Explorer, the Netscape Navigator, or the like. On the other hand, the demand for printing a desired page on the WWW has been increasing.

A computer for browsing Web pages is connected with WWW servers, printers, and other peripheral equipment, for example, via a network system or LAN. The LAN is comprised of a client computer, a server computer, a network OS, a LAN adaptor, a LAN cable, a router, and the like, and makes it possible to share resources such as a hard disk, printer, and the like, to use various kinds of groupware systems such as an e-mail system, a scheduling system, and the like, to share databases, and to establish and utilize intranets. The client computer is the computer for browsing Web pages.

When a user wishes to print a Web page displayed in his/her client computer, which is connected with a WWW server and a printer via a LAN as described above, the user operates the computer and presses a print button on the WWW browser that displays the Web page to be printed. A print command is generated through this operation, and the client computer converts data making up the Web page into page description language (PDL) format, and transmits the PDL-format data to the printer. Thereafter, the CPU in the printer receives, analyzes, and converts the PDL data into bitmap data (imaging data format). Then, the bitmap data is temporarily stored in the memory of the printer, and printed out.

However, conventional techniques as described above would require a wait after the user presses the print button and the print command is generated until processes in the printer like receiving, analyzing, and converting data are complete, thereby keeping the user waiting to receive a desired printed output. The wait means at least time it takes for the printer that has received PDL data to finish converting the data into bitmap data. Some browsers require a user to maintain his/her computer's connection with the Internet during the wait, and thus need communications costs for extra access time. Accordingly, the conventional processes of printing a Web page have disadvantages in high-speed processing and communications costs during the wait.

BRIEF SUMMARY OF THE INVENTION

Accordingly, it is an exemplified general object of the present invention to provide a novel and useful printing system and printing method using the printing system in which the above disadvantages in the prior arts are eliminated.

Another exemplified and more specific object of the present invention is to provide a printing system for printing a Web page that requires no long wait after a print command is transmitted, and immediately initiates printing.

In order to achieve the above objects, a printing method as one exemplified embodiment of the present invention comprises the steps of: a computer creating a print control number and print format information of a Web page that is provided from a WWW server, wherein the computer including a WWW browser through which the Web page is viewed and monitored; the computer transmitting to a printer connected to the computer print information that includes the print control number and the print format information; the printer converting data of the Web page into imaging data; the printer storing the print control number and the imaging data in a memory in the printer; and in response to a print execution command from the computer, the printer printing specific imaging data corresponding to a specific print control number, wherein the specific imaging data is specified by the print execution command among the imaging data stored in the memory. According to this printing method, the computer assigns the control number to a Web page which is now being browsed, irrespective of whether the Web page is to be printed or not, and transmits the print information of the Web page to the printer, and the printer converts the Web page data included in the print information into imaging data. Thereafter, when the computer transmits a print execution command with the control number, the printer prints the imaging data corresponding to the control number. As a result, a browsing user of the Web page can obtain a printed output without waiting for a long time after the print command is transmitted.

A computer as one exemplified embodiment of the present invention comprises: a memory including a WWW browser and a monitoring program; and a control portion that is connected with the memory and operates according to the monitoring program, wherein the monitoring program may monitor a Web page, and create a print control number and print format information of the Web page; and wherein the control portion transmits print information including the print control number and the print format information created by the monitoring program to a printer connected with the computer. According to this computer, the control number is assigned to the Web page which is now being browsed, irrespective of whether the Web page is to be printed or not, and the print information for the Web page is transmitted to the printer. Therefore, if the print execution command with a specific control number is transmitted, the Web page as specified may be printed.

A printing system as one exemplified embodiment of the present invention comprises a computer, a printer., and a network that connects the computer and the printer, wherein the computer comprises: a memory including a WWW browser and a monitoring program; and a control portion that is connected with the memory and operates according to the monitoring program, wherein the monitoring program monitors a Web page, and creates a print control number and print format information of the Web page; and wherein the control portion transmits print information including the print control number and the print format information created by the monitoring program to a printer connected with the computer; and wherein the printer comprises: a control portion that accesses a Web page based upon an address of the Web page that is provided from the computer, obtains data, and converts the data into imaging data; a memory that stores the imaging data; and an image-forming portion that prints the imaging data in response to a print execution command that is provided from the computer and specifies the imaging data. This printing system comprises the above computer and printer, and the network connecting them, and therefore, exerts the same effects as the above computer. As a result, a browsing user of the Web page can obtain a printed output without waiting for a long time after the print command is transmitted.

A computer readable medium as one exemplified embodiment of the present invention stores a program that executes a process comprising the steps of: a computer creating in a computer a print control number and print format information of a Web page that is provided from a WWW server, wherein the computer including a WWW browser through which the Web page is viewed and monitored; the computer transmitting to a printer connected to the computer print information that includes the print control number and the print format information; the printer converting data of the Web page into imaging data; the printer storing the print control number and the imaging data in a memory in the printer; and in response to a print execution command from the computer, the printer printing specific imaging data corresponding to a specific print control number, wherein the specific imaging data is specified by the print execution command among the imaging data stored in the memory.

Other objects and further features of the present invention will become readily apparent from the following description of the embodiments with reference to accompanying drawings.

DETAILED DESCRIPTION OF THE INVENTION

Figure 1:
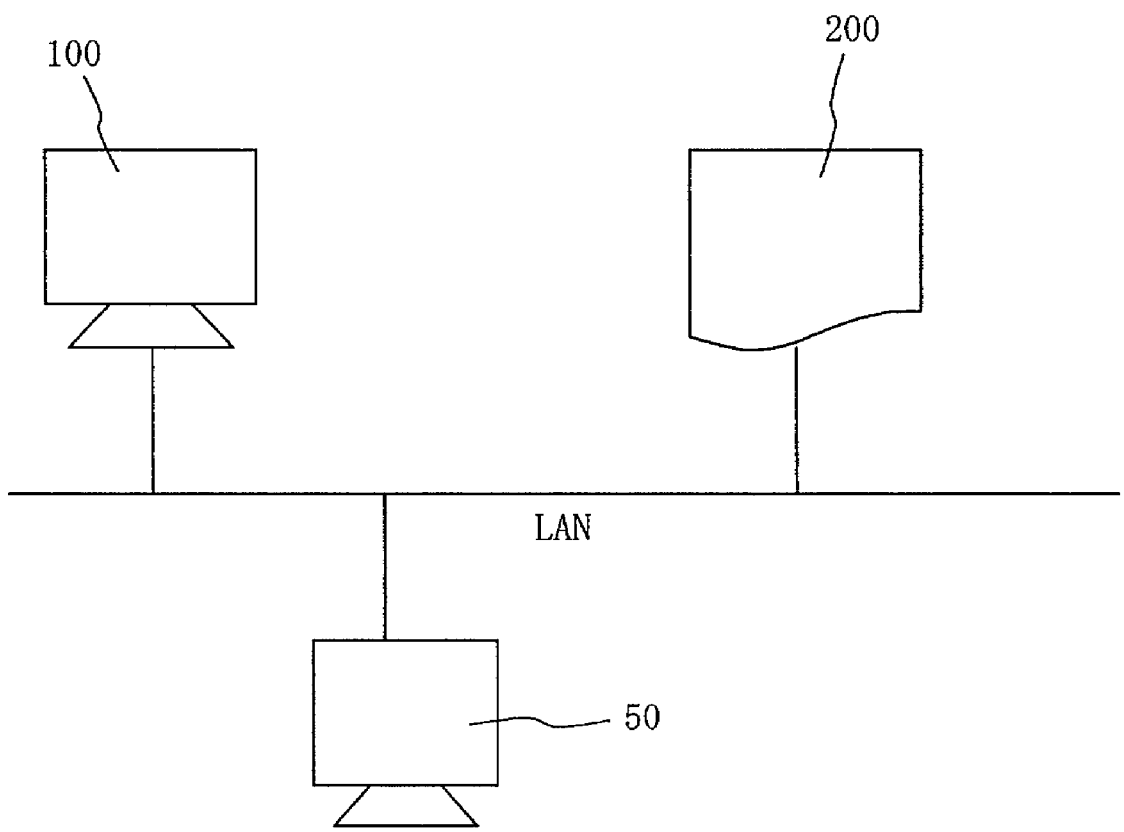
FIG. 1 is a schematic block diagram for showing a printing system in its entirety as one exemplified embodiment of the present invention.

Referring now to FIGS. 1 to 5 inclusive, a description will be given of a printing system 300 as one exemplified embodiment of the present invention. As shown in FIG. 1, the printing system 300 in the present invention includes a WWW server 50, a personal computer (PC) 100, and a printer 200, each networked via a local area network (LAN). FIG. 1 is a schematic block diagram for showing the printing system 300 in its entirety.

The WWW server 50 appears as a so-called Web site in a browser to provide files and data for a WWW client. For example, the WWW server 50 receives a request for a display and/or update of a Web page from the client, and picks up a set of data making up the Web page for the client. In the present embodiment, the client that communicates with the WWW server 50 is the PC 100.

Figure 2:
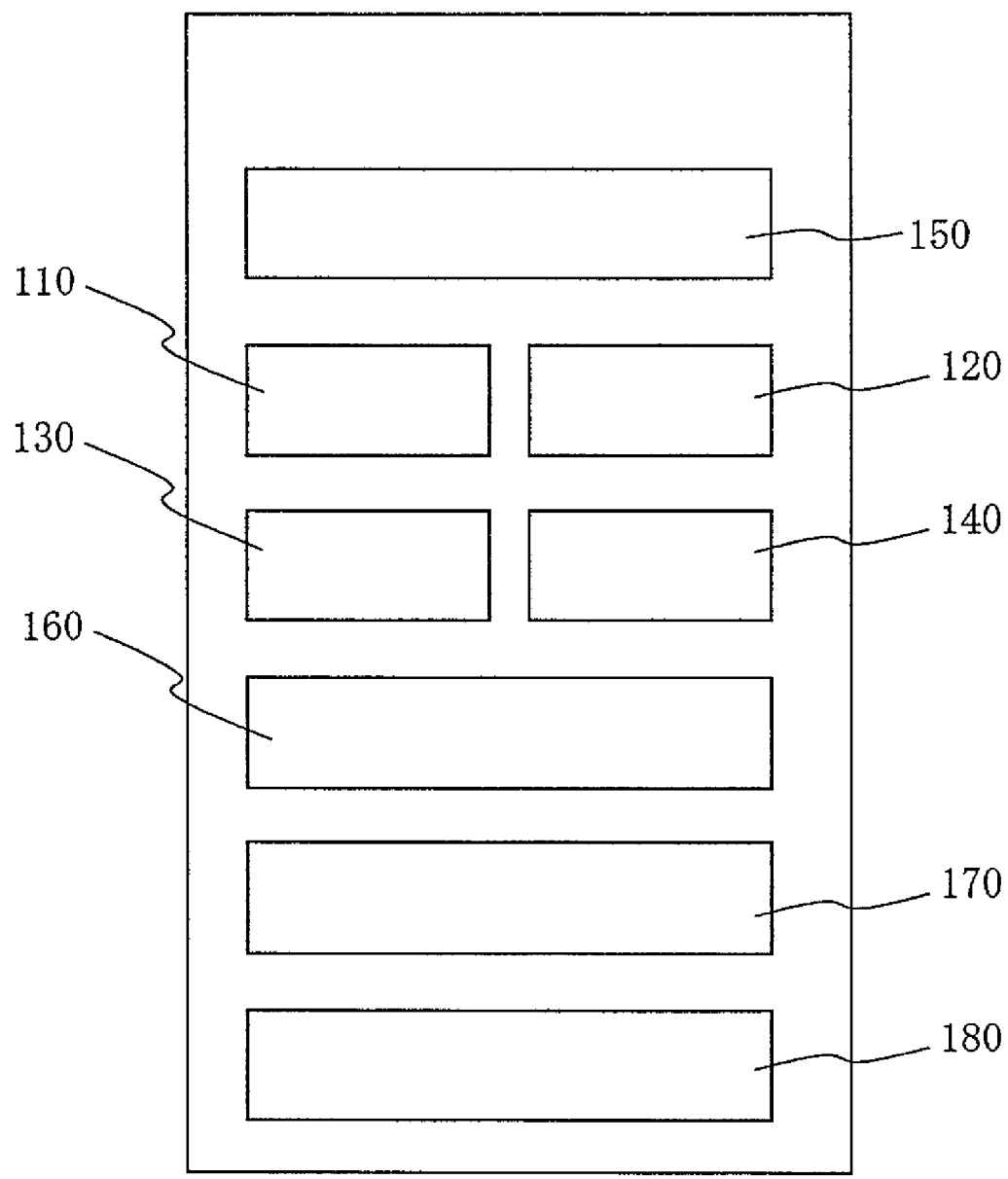
FIG. 2 is a schematic block diagram for showing a structure of a personal computer (PC).

The PC 100 includes, as shown in FIG. 2, a CPU 110, a ROM 120, a RAM 130, a HDD 140, an interface portion 150, a Web information storage area 160, a WWW browser 170, and a monitoring program 180. FIG. 2 is a schematic block diagram for showing the PC 100. Since the CPU 110, various kinds of the storage devices 120 through 140, and the interface portion 150 are commonly used components of the PC 100 to which any devices known in the art are applicable, a detailed description will now be omitted. The PC 100 is, as in FIG. 1, connected with the WWW server 50 or the printer 200 that will be described later via the interface portion 150.

The Web information storage area 160 stores Web page-related information in general such as Web page data and a Web page address or uniform resource locator. The Web information storage area 160 may also store information on a control number assigned to each piece of information on the Web page by the monitoring program 180 that will be described later. For the Web information storage area 160, the storage devices 120 through 140 may be allotted, or a dedicated storage medium such as a hard disk and a removable disk (e.g., floppy disk, optical disk, and magneto-optical disk) may be provided and used.

The WWW browser 170 is software for browsing a Web page made up of various files including characters, images, movies, and sounds, which are called up using the Hyper Text Transfer Protocol or HTTP, and displayed on the browser. The WWW browser 170 may also display a Portable Document Format file or the like using applications designed specifically for displaying each document format file. The WWW browser 170 has a menu option for printing, and a user's selection of the print option from the menu would generate a print command. The WWW browser 170 and the monitoring program 180 that will be described below are both stored in the HDD 140.

The monitoring program 180 is a program for monitoring a browsing status of the Web page, and simultaneously starts operating with a launching of the WWW browser 170. The monitoring program 180 may be provided, for instance, as a plug-in. The monitoring program 180 that has started operating gives a control number to the Web page displayed only for browsing in the WWW browser 170, regardless of whether the page is to be printed or not, and transfers a set of data making up the Web page with the control number to the printer 200.

Figure 3:
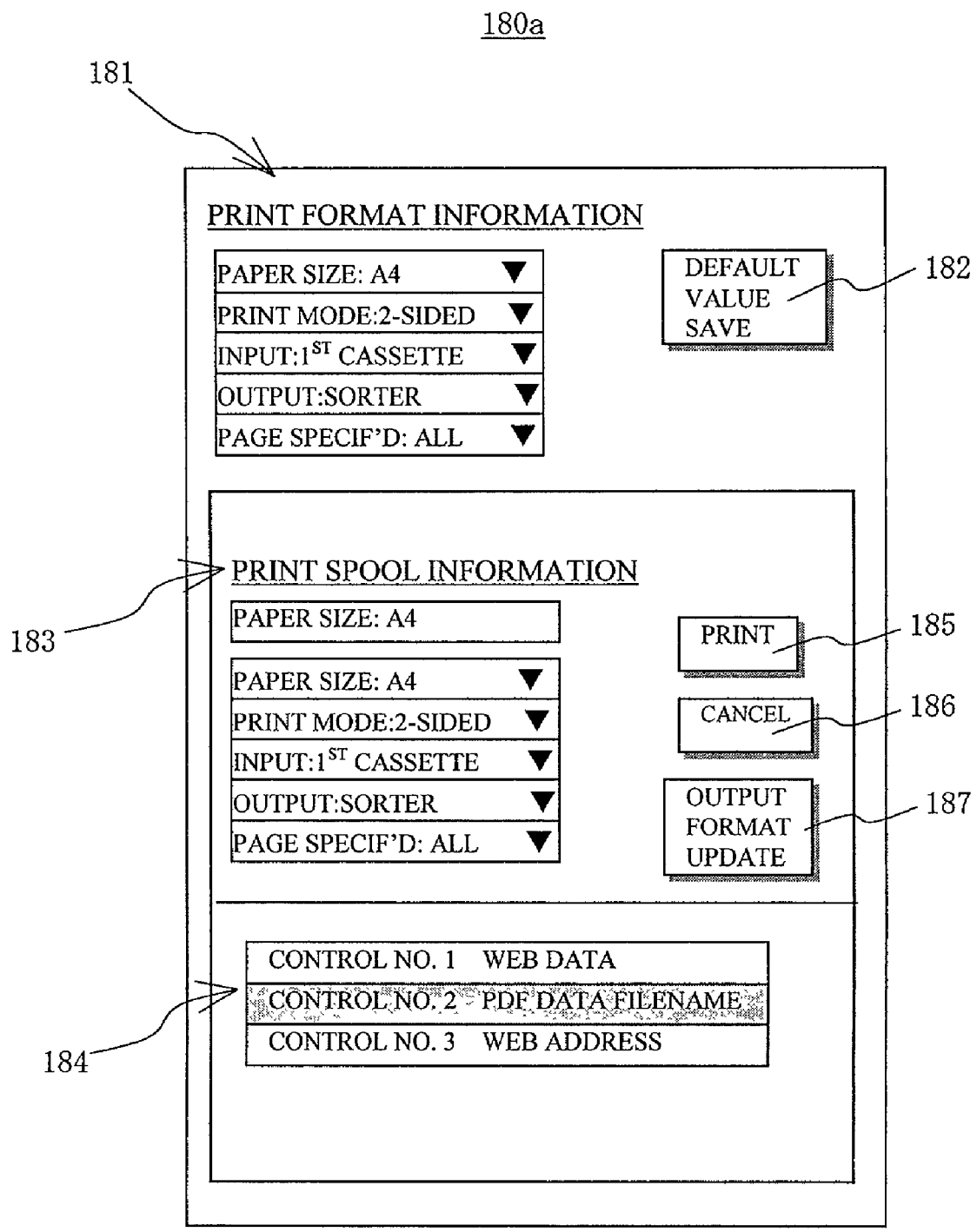
FIG. 3 is an exemplified diagrammatic sketch of a monitoring screen displayed on a monitor of the PC shown in FIG. 2.

The control number is created for the Web page that has been displayed or updated by a browsing user so that each Web page is numbered in order of browsing. The control number is stored in the Web information storage area 160 in the PC 100 and in a print data storage area 250 in the printer 200, together with the Web page data. Therefore, if the browsing user selects a specific control number N in the PC 100, and issues a print command to the printer 200, then the printer 200 may retrieve a corresponding set of print data assigned the same control number N, and perform a printing operation. In the present embodiment, as shown in FIG. 3, the control number is generated consecutively in the order of browsing the Web pages, as Control Number 1, Control Number 2, and the like, but not necessarily expressed in Arabic numerals; therefore alphabets, Roman numerals, or the like may also be used. When the monitoring program 180 starts operating, on a monitor of the PC 100, for example, a monitoring screen 180a is displayed as shown in FIG. 3. FIG. 3 is an exemplified diagrammatic sketch of the monitoring screen 180a displayed on the monitor of the PC 100.

The monitoring screen 180a shown in FIG. 3 exhibits a state in which a control number and a set of the Web page data accompanied with the pertinent control number are transmitted to the printer 200 by the monitoring program 180. In the present embodiment, that operation which the monitoring program 180 transmits the control number and a set of the Web page data accompanied with the pertinent control number as above is referred to as "read ahead" or "read-ahead mode". The monitoring screen 180a may be separately presented in two screens each displaying print format information 181 and print spool information 183. The print format information 181 includes, as shown in FIG. 3, information on settings of several varieties for a printer and printing such as a paper size, a print mode, an input and output location, and a page number specified. The information on settings of several varieties is called print format, and this information transmitted to the printer 200. Adjacent to the print format information 181 is a default saving button 182, which is used when the print format is set or updated. When the print format is set and then the default saving button 182 is clicked, a newly set value is saved.

The print spool information 183 displays the print format information corresponding to each control number. In a lowest portion of the monitoring screen 180a are provided a control number display portion 184 in which the control numbers and the Web pages corresponding thereto are displayed, and for example, selecting the control number 2 would change the color of a frame for the control number 2, and display details thereof on an upper portion of the screen for the print spool information 183. Adjacent to the print spool information 183 are displayed a print button 185, a cancel button 186 and an output format update button 187.

The print button 185 is used for transmitting the control number and the print command to the printer 200. One click of the print button 185 would initiate printing bitmap data (imaging data) that has been prepared in advance. When the printing is complete, the control number specifying data to be printed and the data corresponding thereto disappear from the print spool information screen. The cancel button 186 is dedicated to eliminating the spooled print data. For instance, in order to eliminate the print data specified by the control number 2, the control number 2 is selected among those in the control number display portion 184, to display the details in the upper portion of the screen for the print spool information 183. Thereafter, when the cancel button 186 is clicked, the control number and cancel information is transmitted to the printer 200, and the pertinent control number information stored in the printer 200 is eliminated.

The output format update button 187 is for updating a spooled print format. After a variety of setting information on the print format displayed on the details screen corresponding to the control number is changed, by clicking the output format update button 187, the changed print format information with the control number is transmitted from the PC 100 to the printer 200, updating information under the control of the printer 200.

As described above, the monitoring program 180 may assign the control number to each Web page data, and control a printing process through the PC 100 using the control number. Moreover, the Web data to which the control number is assigned has already been transmitted to and stored in the print data storage area 250 that will be described later in a bitmap data format, in other words, read ahead, and thus clicking the print button 185 would immediately initiate a printing operation thereof.

Figure 4:
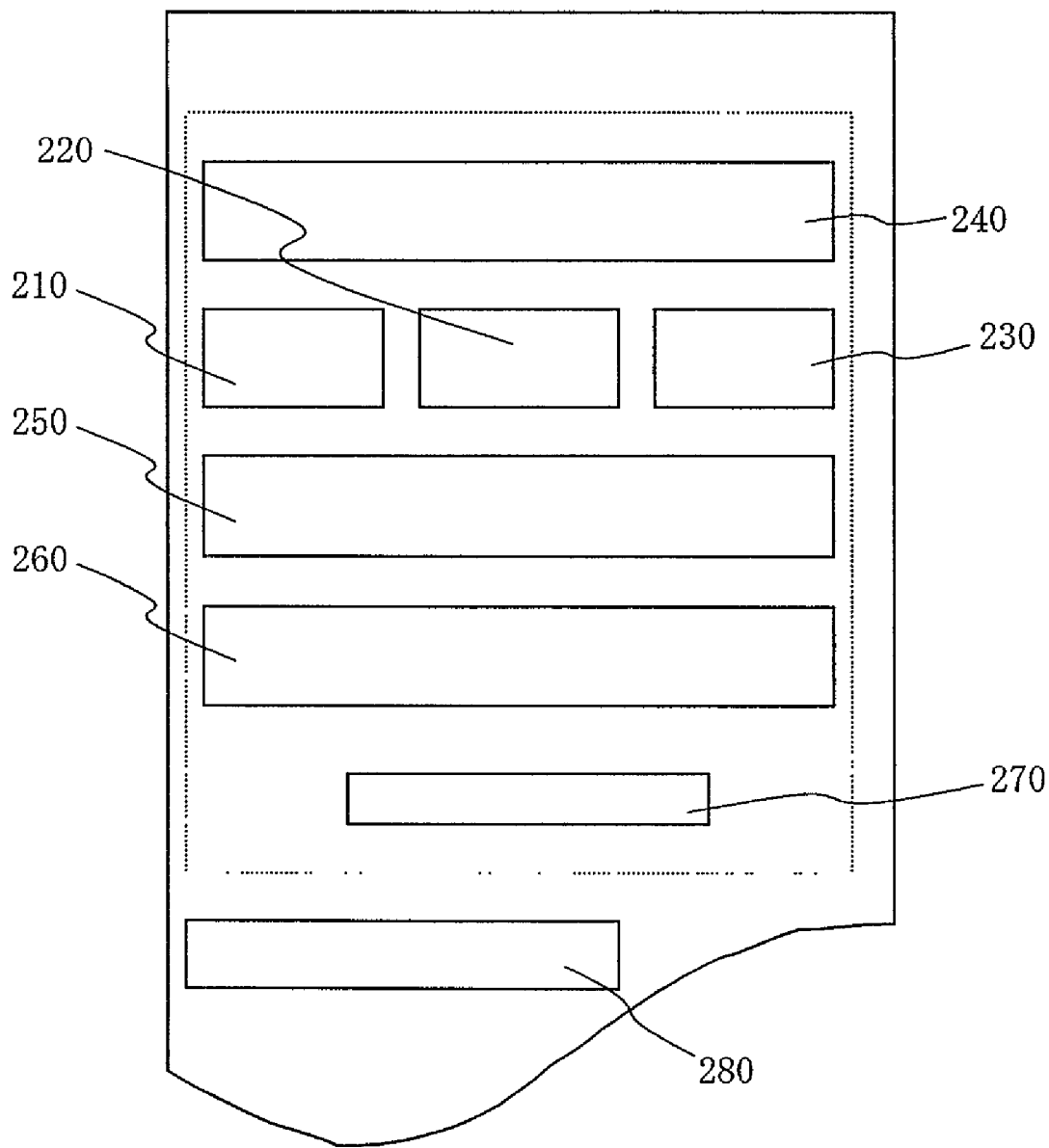
FIG. 4 is a schematic block diagram for showing a structure of a printer.

The printer 200 includes, as shown in FIG. 4, a CPU 210, a ROM 220, a RAM 230, an interface portion 240, a print data storage area 250, an operator panel 260, a control portion 270, and a printer engine portion 280. FIG. 4 is a schematic block diagram for showing a structure of the printer 200. A description will now be given of the printer 200 exemplified as a laser printer (page printer) according to the present embodiment.

The CPU 210, which controls operations of each portion, is a concept extending generally to an MPU or other control portions no matter what denotes the concept. The CPU 210 can convert PDL data transmitted from the PC 100 into bitmap data (imaging data). The ROM 220 stores firmware (programs) and resident font data. The RAM 230 is used for a memory area, and partly for a print data storage area 250.

The interface portion 240 is, as shown in FIG. 1, provided for establishing connection with the WWW server 50 or the PC 100.

The print data storage area 250 stores bitmap data created by the CPU 210 and a control number corresponding to the data, and further print format information. Imaging data stored in the print data storage area 250 includes not only characters, but also converted image data.

Figure 5:
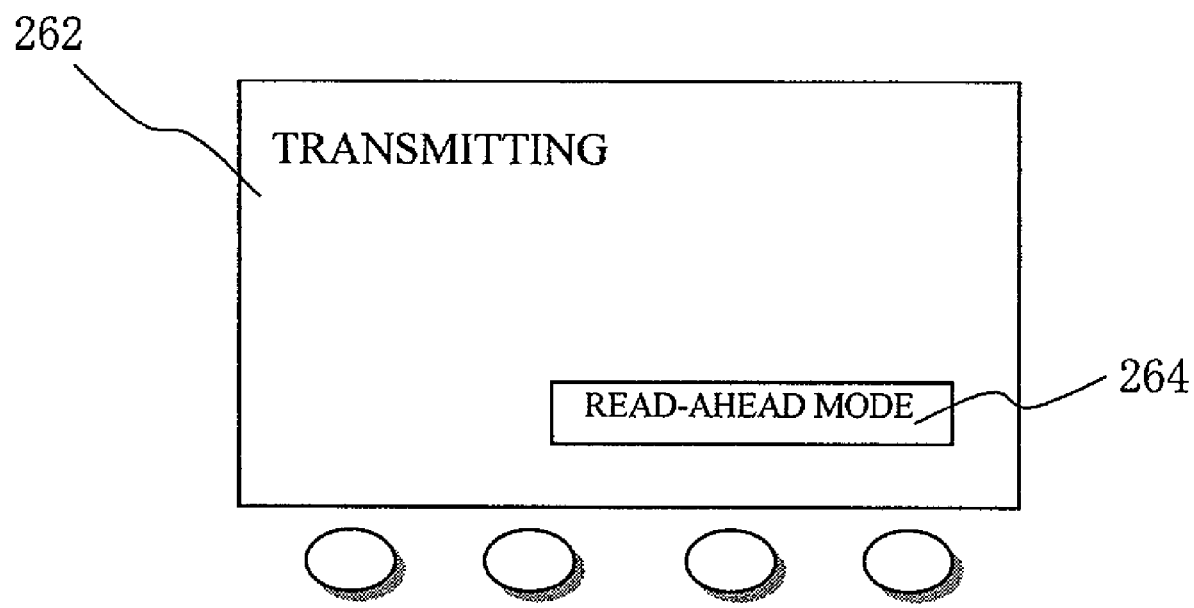
FIG. 5 is an exemplified diagrammatic sketch of a display screen displayed in an operator panel in the printer shown in FIG. 4.

The operator panel 260, which is provided to receive a user's instruction and display a current status, is mounted on a housing surface of the printer 200. The operator panel 260 displays, for instance, as depicted in FIG. 5. FIG. 5 is an exemplified diagrammatic sketch of a display screen 260a displayed in the operator panel in the printer 200. In the display screen 260a, a status display screen 262 and a read-ahead mode display field 264 are displayed.

The status display screen 262 is a screen that displays the status of the printer 200. The status display screen 262 as shown in FIG. 5 indicates that the printer 200 is currently in a receiving state in which a variety of print data including Web page data from the PC 100 is being received.

The read-ahead mode display field 264 indicates that the current relationship between the PC 100 and the printer 200 is in the read-ahead mode. Usable means for getting in and out of the read-ahead mode are the following two types: one is to switch the mode using a mode setting command entered from the PC 100; and the other is to switch the mode using an operator panel switch provided on the printer 200. The read ahead technique represents a good approach for printing Web pages, and it may thus be a good idea to control the switching of the read-ahead mode as may be set at the same time as when a Web page is displayed.

The control portion 270 may access the WWW server 270 by relying on the Web page address transmitted from the PC 100, and obtain data of the Web page. The control portion 270 is used, where particularly selected, for the second and third printing methods that will be described later, and substitutes an operation of obtaining Web page data that is usually carried out by the PC 100. Therefore, the printer 200 having the control portion 270 may reduce a burden imposed upon the PC 100.

The printer engine portion 280 performs a printing process and operation. In the present embodiment, the printer engine portion 280 denotes an image-forming portion of a nonimpact printer, or typically laser printer, which provides recording by depositing a developing agent as a recording material on a recordable medium (e.g., printing paper, and OHP film). The image-forming portion generally includes a photoconductive insulator (e.g., photosensitive drum), and follows the procedural steps of charging, exposure to light, development, transfer, fixing, and other post-processes.

The charging step uniformly electrifies the photosensitive drum (e.g., at −780V). The exposure step irradiates a laser beam or the like on the photosensitive drum, and changes the electrical potential at the irradiated area down, for example, to −60 V or so, forming an electrostatic latent image. The development step electrically deposits a developing agent onto the photosensitive drum using, for example, the reversal process, and visualizes the electrostatic latent image. The transfer step forms a toner image corresponding to the electrostatic latent image on the recordable medium. The fixing step fuses and fixes the toner image on the medium using heat, pressure or the like, thereby obtaining a printed matter. The post-processes may include charge neutralization and cleaning on the photosensitive drum from which toner has been transferred out, a collection and recycle and/or disposal of residual toner, etc.

Figure 6:
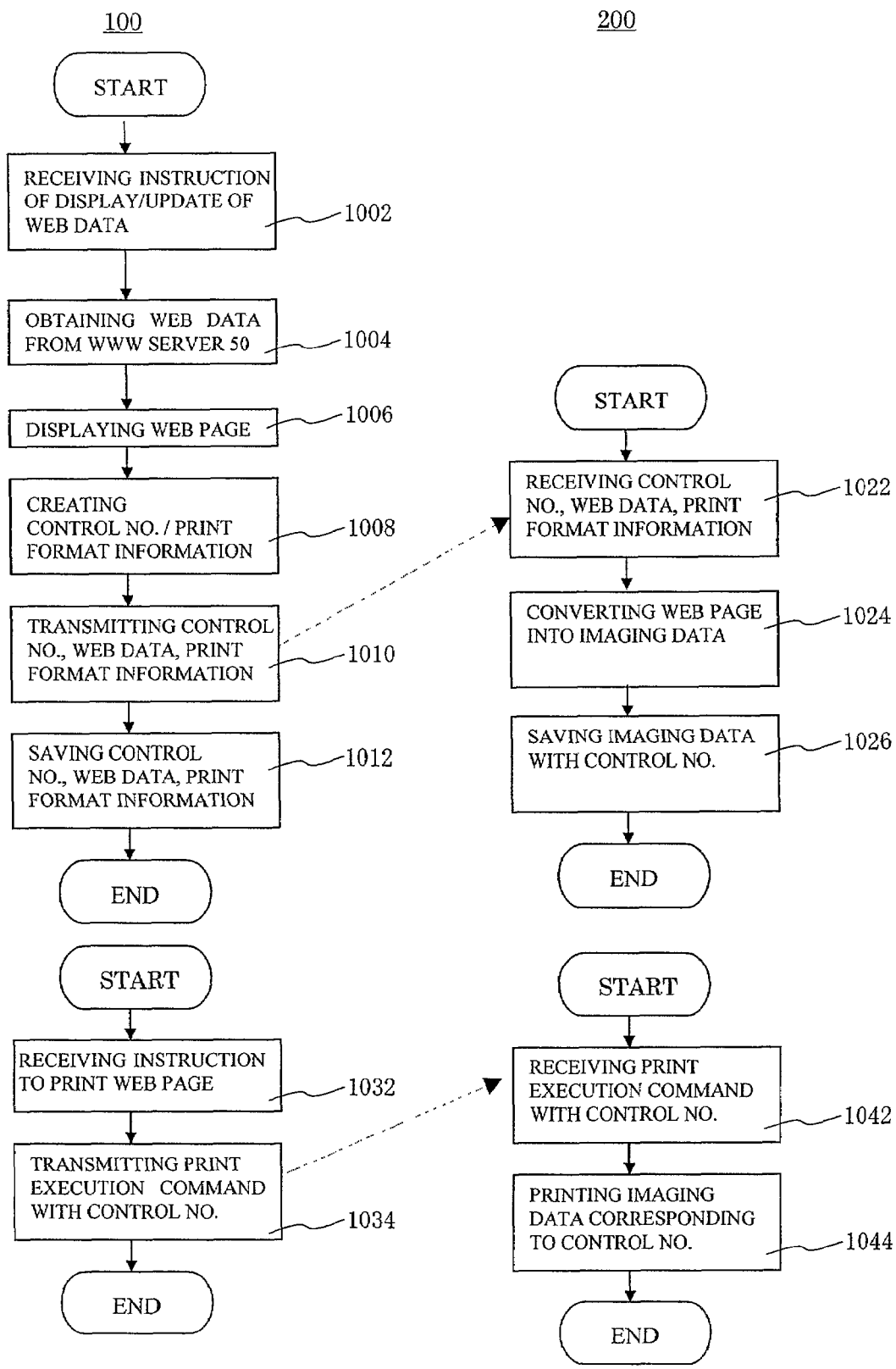
FIG. 6 is a flowchart for showing a first printing method step by step.
Figure 7:
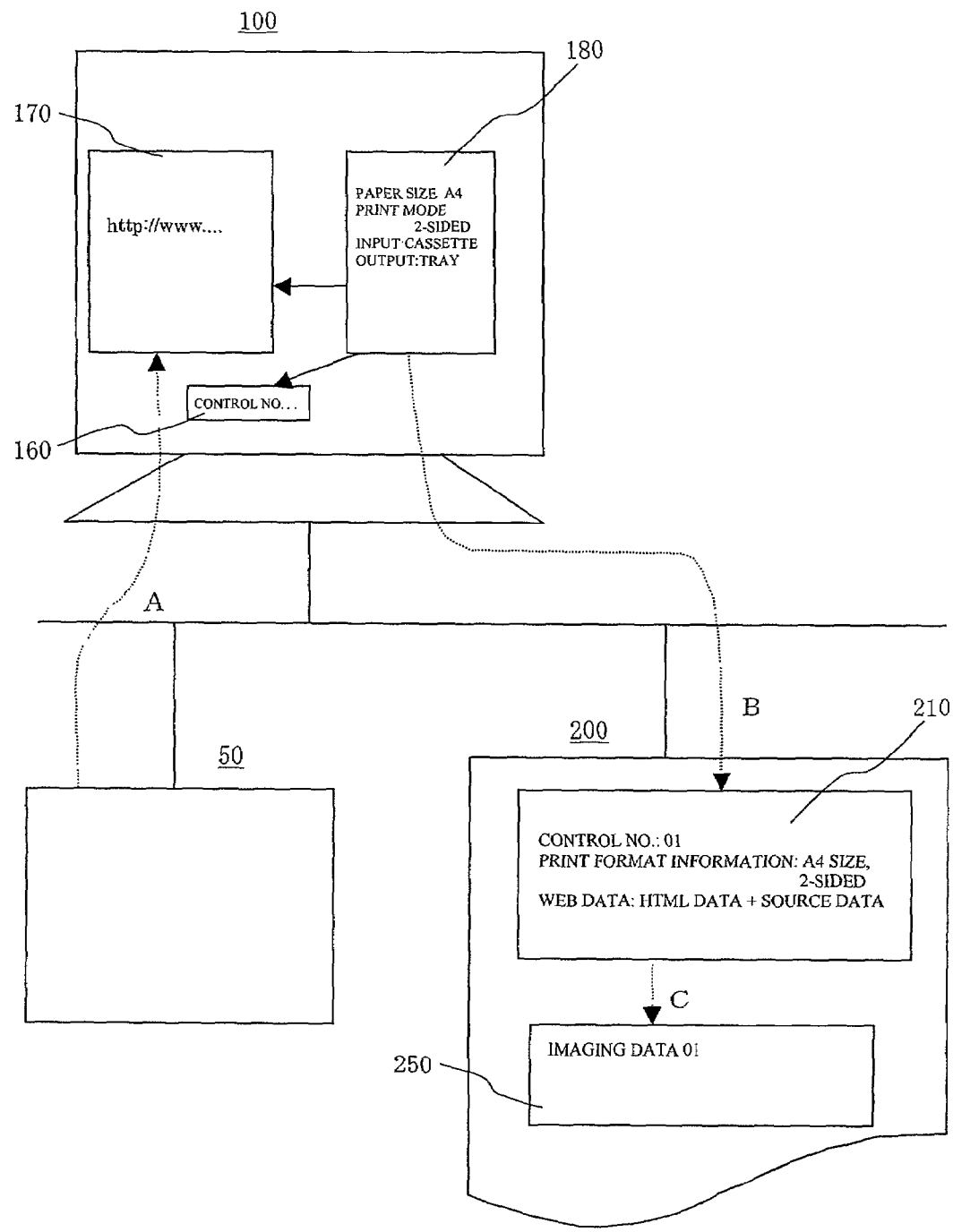
FIG. 7 is a block diagram for showing each data flow corresponding to the flowchart shown in FIG. 6.

Referring now to the drawings, a description will be given of a printing method of the inventive printing system 300. First, a first printing method of the present invention will be described with reference to FIGS. 6 and 7. FIG. 6 is a flowchart for showing the first printing method step by step. FIG. 7 is a block diagram for showing each data flow corresponding to the flowchart shown in FIG. 6.

As described above, when the WWW browser 170 is launched in the PC 100, the monitoring program 180 for monitoring a state of browsing information on the Web is launched altogether. During operation of the monitoring program 180, the monitoring screen 180a that displays the monitoring state is directly displayed on the monitor display of the PC 100, or displayed as an icon for the monitoring program in a display screen of the WWW browser 170.

When a user browsing Web pages wishes to display a new Web page or update (reload) a page currently displayed on the WWW browser 170, the PC 100 receives an instruction of display/update of the Web page (step 1002), and obtains a set of Web data constituting the Web page from the WWW server 50 as indicated by an arrow A in FIG. 7 (step 1004). Thereafter, the PC 100 displays the Web page as intended on the monitor screen (step 1006).

When the Web page is displayed in the PC 100, the monitoring program 180 creates a control number and print format information (as shown in FIG. 3) of the Web page irrespective of whether the pertinent Web page is to be printed or not (step 1008).

Then, as indicated by an arrow B in FIG. 7, the monitoring program 180 transmits a set of data constituting the Web page along with the created information to the printer 200 (step 1010). The control number, Web page data, and print format information created and transmitted by the monitoring program 180 are saved and stored in the Web information storage area 160 (step 1012).

The above-described steps 1002 through 1012 are followed every time when information to be displayed in the Web page should be updated for displaying a new Web page or reloading (updating) the same Web page. The control number may be a unique number such as a combination of a MAC address (or IP address) with a sequential number, so that overlap of the control number may be avoided even when the printer 200 is shared in a multi-host environment.

The printer 200 first receives the control number, Web page data, and print format information transmitted from the PC 100 in step 1010 (step 1022). Thereafter, the CPU 210 mounted in the printer 200 analyzes the Web page data based upon the print format information, and converts in advance the Web page data into imaging data that the printer engine portion 280 may print, as indicated by an arrow C in FIG. 7 (step 1024). Then the control number and imaging data are saved and stored in the print data storage area 250 (step 1026).

When the user browsing Web pages, for example, wishes to print a Web page to which the control number 2 is assigned, in the monitoring screen 180a of the PC 100 is displayed a print data of the control number 2. If the user presses the print button 185 in the monitoring screen 180a, then the PC 100 is instructed to print (step 1032). Thereafter, the PC 100 in response to the print instruction transmits a print execution command with the control number to the printer 200 (step 1034). In this stage, the printer 200 has already received and converted the print data for the Web page to be printed when receiving the print instruction from the user in step 1042, and thus the PC 100 need not redundantly transmit the print data.

When the printer 200 receives the print execution command with the control number from the PC 100 (step 1042), the CPU 210 in the printer 200 picks up a set of converted imaging data corresponding to the control number from the print data storage area 250, and transmits the same to the printer engine portion 280. Then, the printing is initiated (step 1044).

According to the first printing method in the present invention, the PC 100 transmits Web page data to the printer 200 irrespective of whether the Web page is to be printed or not, and the printer 200 stores the pertinent Web page as printable imaging data. Therefore, when the PC 100 transmits a print command for a Web page as specified, the printer 200 initiates printing without keeping a browsing user waiting, and thus a printed output as desired may be obtained in a short time after the print command transmittal. Thus, according to the first printing method, the Web page data are obtained by the PC 100, and transmitted to the printer 200. Due to such data flow (FIG. 7), the printer 200 is not necessarily required to establish direct connection with the WWW server 50 via the LAN.

Figure 8:
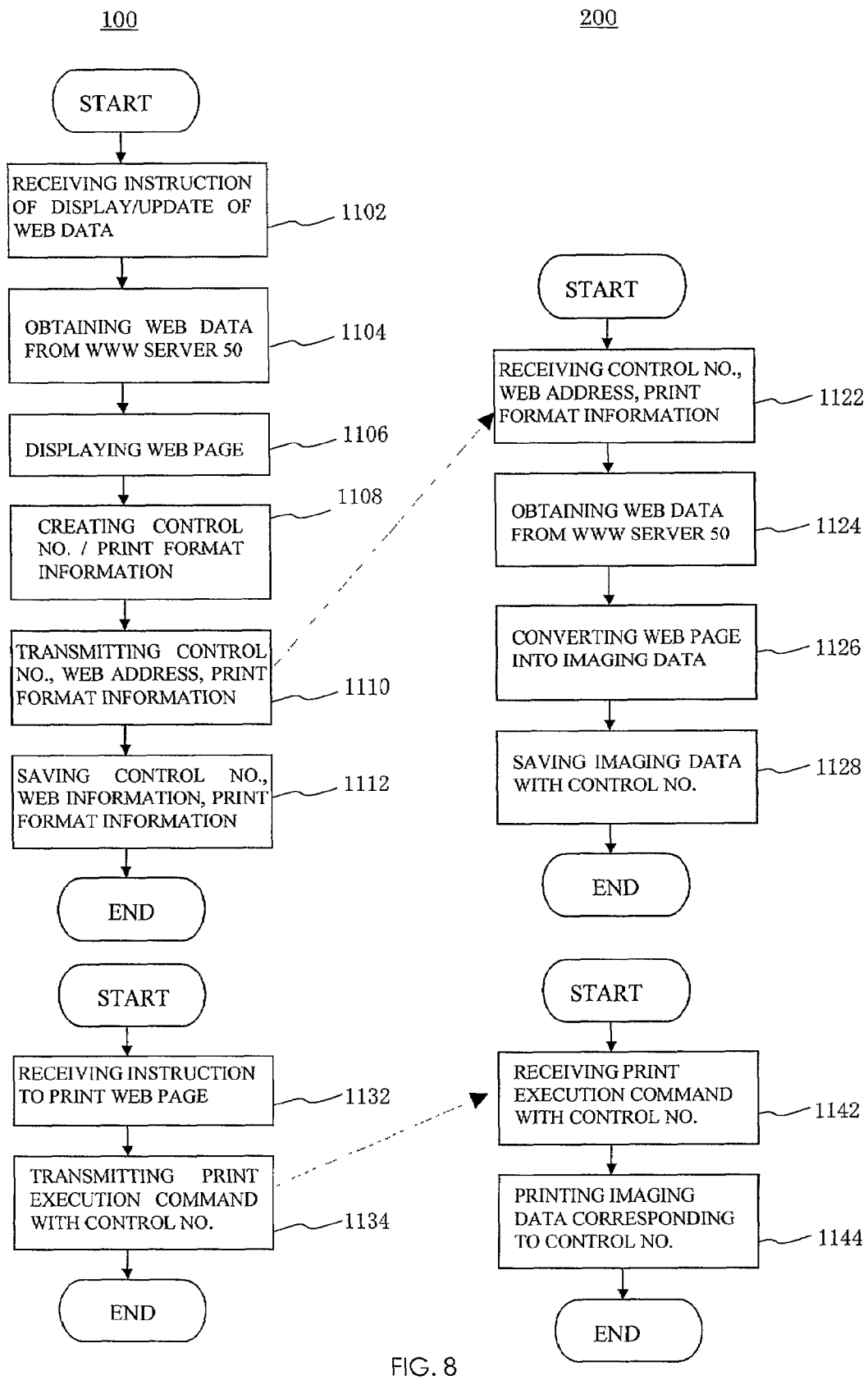
FIG. 8 is a flowchart for showing a second printing method step by step.

Next, a description will be given of a second printing method of the present invention with reference to FIGS. 8 and 9. FIG. 8 is a flowchart for showing the second printing method step by step, and FIG. 9 is a block diagram for showing each data flow corresponding to the flowchart shown in FIG. 8.

According to the second printing method, since the steps in the PC 100 from receiving an instruction of display/update of the Web page (step 1102) to creating a control number and print format information of the Web page irrespective of whether the pertinent Web page is to be printed or not (step 1108) are the same as those in the first printing method, a detailed description will be omitted herein.

Figure 9:
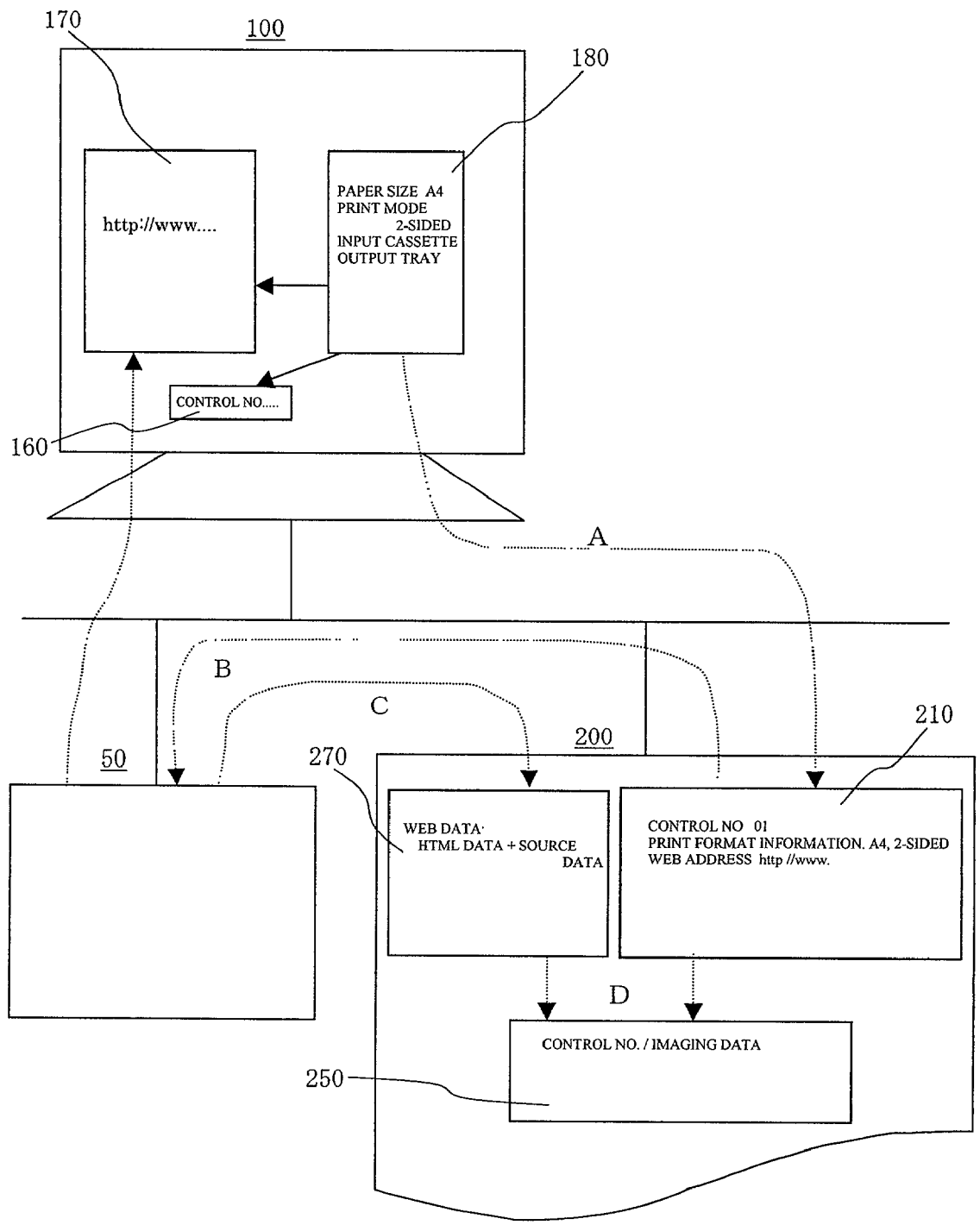
FIG. 9 is a block diagram for showing each data flow corresponding to the flowchart shown in FIG. 8.

In the second printing method, as indicated by an arrow A in FIG. 9, the monitoring program 180 transmits a Web page address with the created information to the printer 200 (step 1110). The Web page data and print format information including the control number, Web page data including the address, and print format information created and transmitted by the monitoring program 180 are saved and stored in the Web information storage area 160 (step 1112). The steps 1102 through 1112 are followed every time when information to be displayed in the Web page should be updated for displaying a new Web page or reloading (updating) the same Web page.

The printer 200 first receives the control number, Web page address, and print format information transmitted from the PC 100 in step 1110 (step 1122). Thereafter, the printer 200, as indicated by an arrows B and C in FIG. 9, receives the Web page data from the WWW server 50 based upon the Web page address (step 1124). Then, the CPU 210 mounted in the printer 200 analyzes the Web page data based upon the print format information, and converts in advance the Web page data into imaging data that the printer engine portion 280 may print, as indicated by an arrow D in FIG. 9 (step 1126). After all, the control number and imaging data are saved and stored in the print data storage area 250 (step 1128).

When the user browsing Web pages, for example, wishes to print a Web page to which the control number 2 is assigned, as in the first printing method, the PC 100 is instructed to print the Web page by the browsing user of the PC 100 (step 1132), and transmits a print execution command with the control number to the printer 200 (step 1134). When the printer 200 receives the print execution command with the control number from the PC 100 (step 1142), as in the first printing method, the printer engine portion 280 initiates printing (step 1144).

In the present invention, as in the second printing method, the printer 200 may obtain the Web page data directly from the WWW server. In that event, the PC 100 need not convert the Web page data into PDL, and thus can be configured to achieve reduced time required for steps 1102 through 1110.

Figure 10:
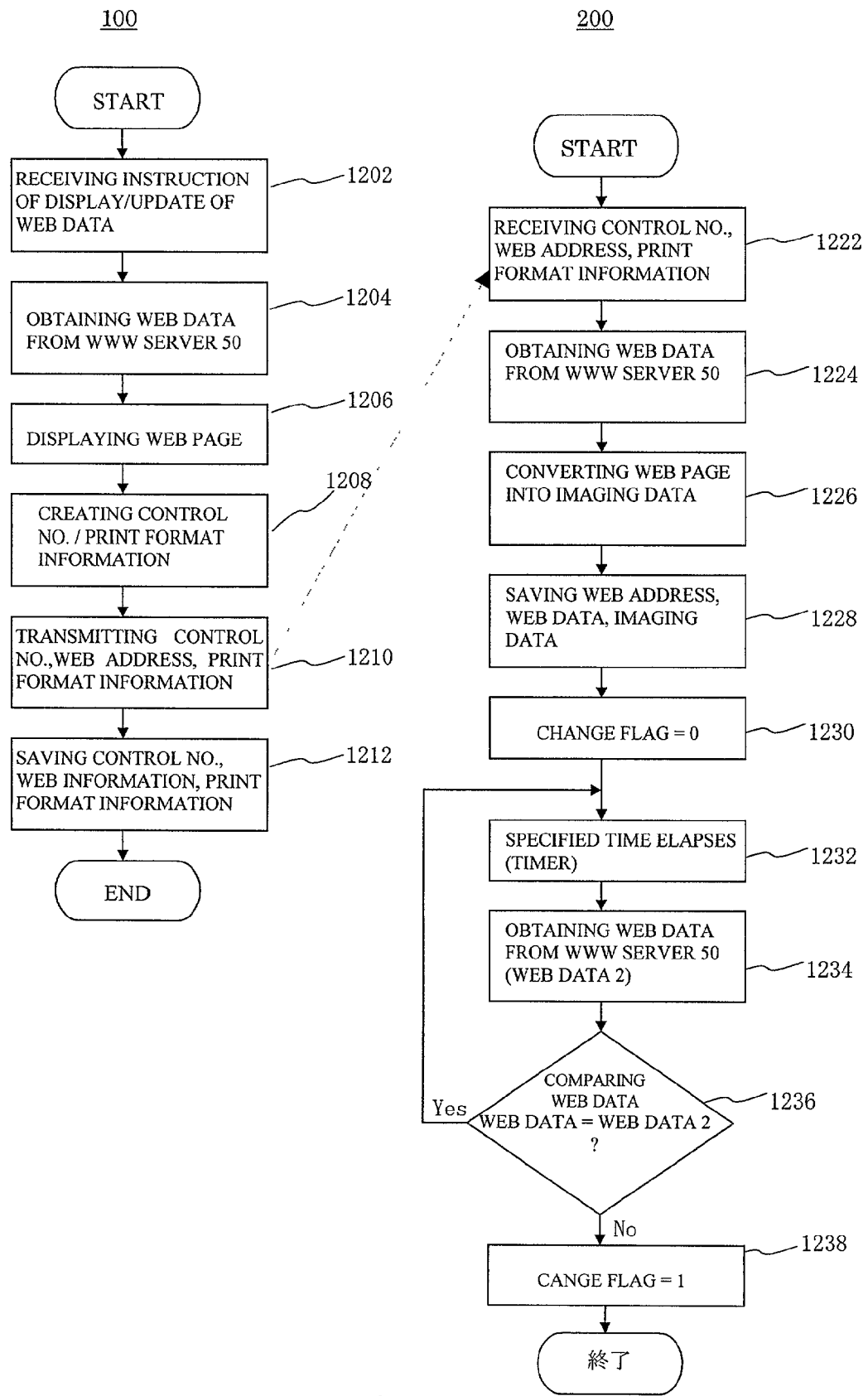
FIG. 10 is a flowchart for showing the former half of a third printing method step by step.
Figure 11:
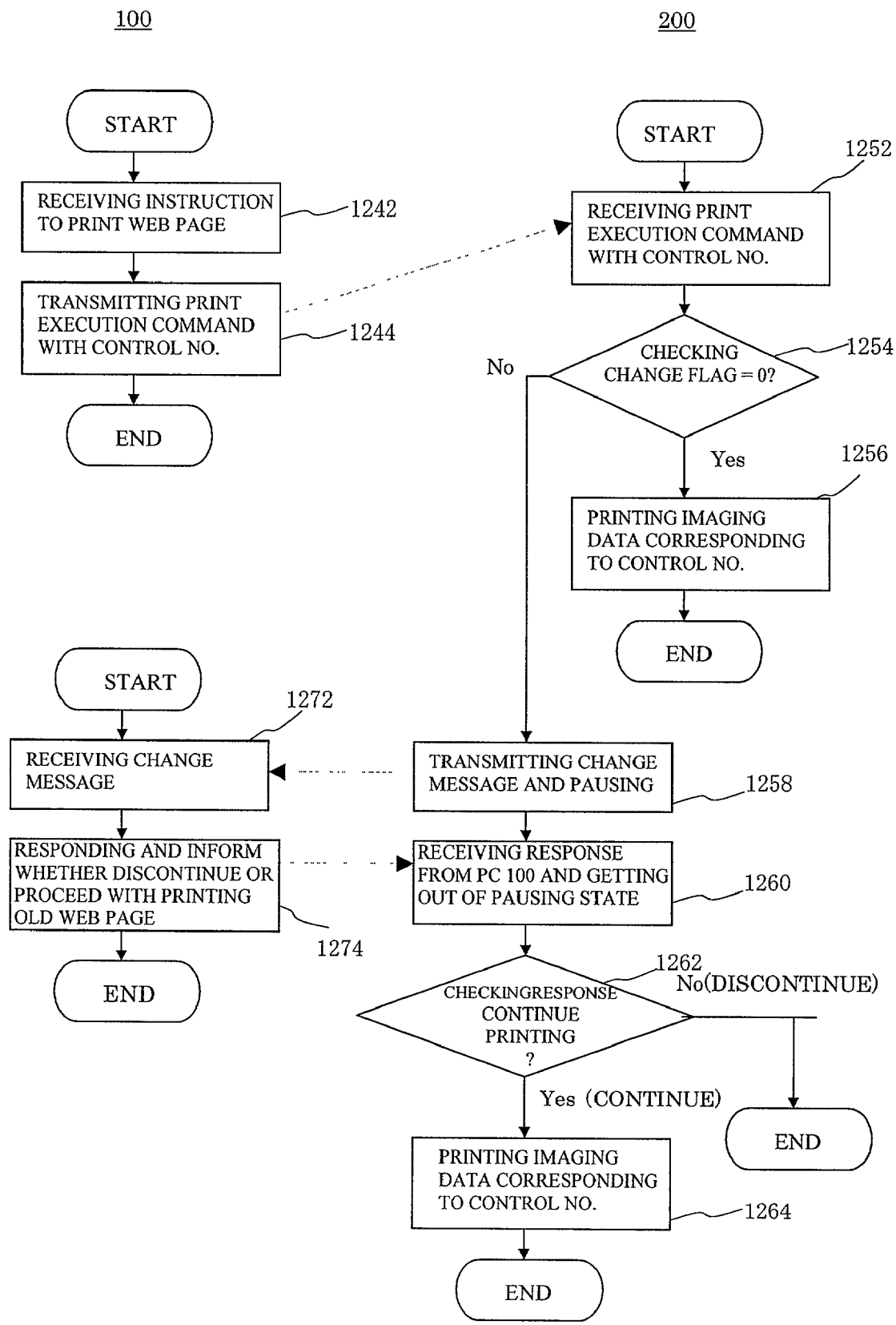
FIG. 11 is a flowchart for showing the latter half of the third printing method step by step.

A description will be given of a third printing method of the present invention with reference to FIGS. 10 and 11. FIG. 10 is a flowchart for showing the former half of the third printing method step by step. FIG. 11 is a flowchart for showing the latter half of the third printing method step by step.

In the third printing method, since the steps in the PC 100 from receiving an instruction of display/update of the Web page (step 1202) to transmitting the Web page address with the created information to the printer 200 (step 1210), and saving and storing the Web page data including the address, and print format information in the Web information storage area 160 (step 1212) are the same as those in the second printing method, a detailed description will be omitted herein. The steps 1202 through 1214 are followed every time when information to be displayed in the Web page should be updated for displaying a new Web page or reloading (updating) the same Web page.

Similarly, since the steps in the printer 200 from receiving the control number, Web page address, and print format information transmitted from the PC 100 in step 1210 to analyzing the Web page data based upon the print format information and converting the same into imaging data (step 1226), in the CPU 210 are the same as those in the second printing method, a detailed description will be omitted herein. Thereafter, in contrast to the second printing method, the control number, Web page address, Web page data, and imaging data are saved and stored in the print data storage area 250 in step 1228.

Then, the printer 200 clears a change flag (change flag=0) for the control number (step 1230). Subsequently, a timer is set, and after a specified time elapses (step 1232), the printer 200 receives the Web page data (Web page data 2) again from the WWW server 50 relying on the Web page address saved in the print data storage area 250 (step 1234), and compares the same with the Web page data saved in the print data storage area 250 (step 1236).

As a result of the comparison, if the Web page data saved in the print data storage area 250 and the newly received Web page data 2 are the same, the process goes back to step 1032, while if they are different, a change flag is set (change flag=1) and a periodical check process is completed (step 1238).

When a user browsing Web pages, for example, wishes to print a Web page to which a control number 2 is assigned, the PC 100 receives a print instruction of the browsing user (step 1242), and transmits a print execution command with the control number to the printer 200 (1244).

The printer 200 receives the print execution command with the control number from the PC 100 (step 1252), and checks a change flag corresponding to the control number (step 1254). If the change flag=1, the printer 200 picks up a set of converted imaging data corresponding to the control number from the print data storage area 250, and transmits the same to the printer engine portion 280, and prints the page of data (step 1256). On the other hand, if the change flag=1, a change message stating that the pertinent Web page on the WWW server 50 has already been updated to the PC 100, and the printer 200 gets in the state of pausing (step 1258).

The PC 100, which receives the change message from the printer 200 (step 1272), responds back and informs the printer 200 of whether to proceed with or discontinue printing the old Web page (step 1274). The printer 200, which receives the response from the PC 100 (step 1260), comes out of the state of pausing.

After the printer 200 checks what the response says (step 1060), if the response is to proceed with printing, the printer 200 transmits the set of converted imaging data corresponding to the control number (step 1264). On the other hand, if the response is to discontinue printing, the printer 200 completes the printing operation.

In the present invention, according to the third printing method, the printer can obtain the Web page data directly from the WWW server, and repeat a periodical check of the Web page data at established periods. Accordingly, in the third printing method, the newest Web page data may be obtained, and printed.

Figure 12:
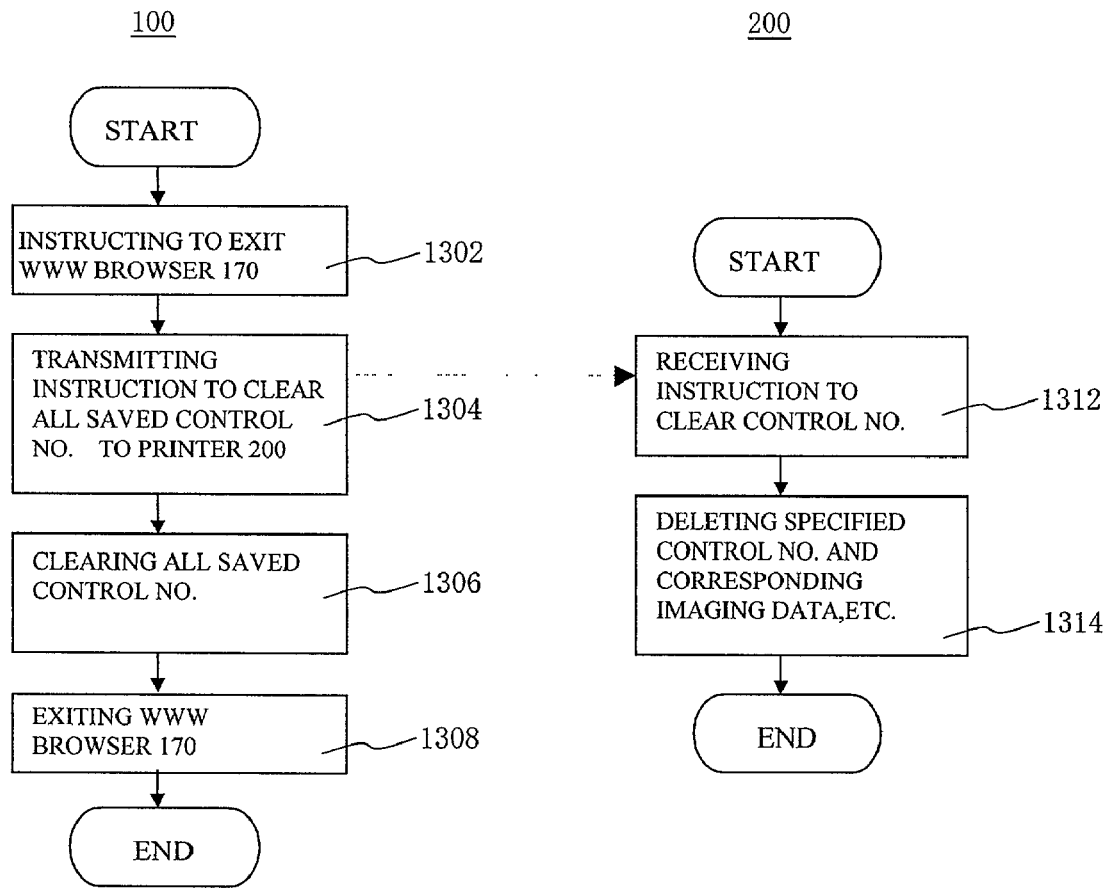
FIG. 12 is a flowchart for showing a first optional printing process step by step.
Figure 13:
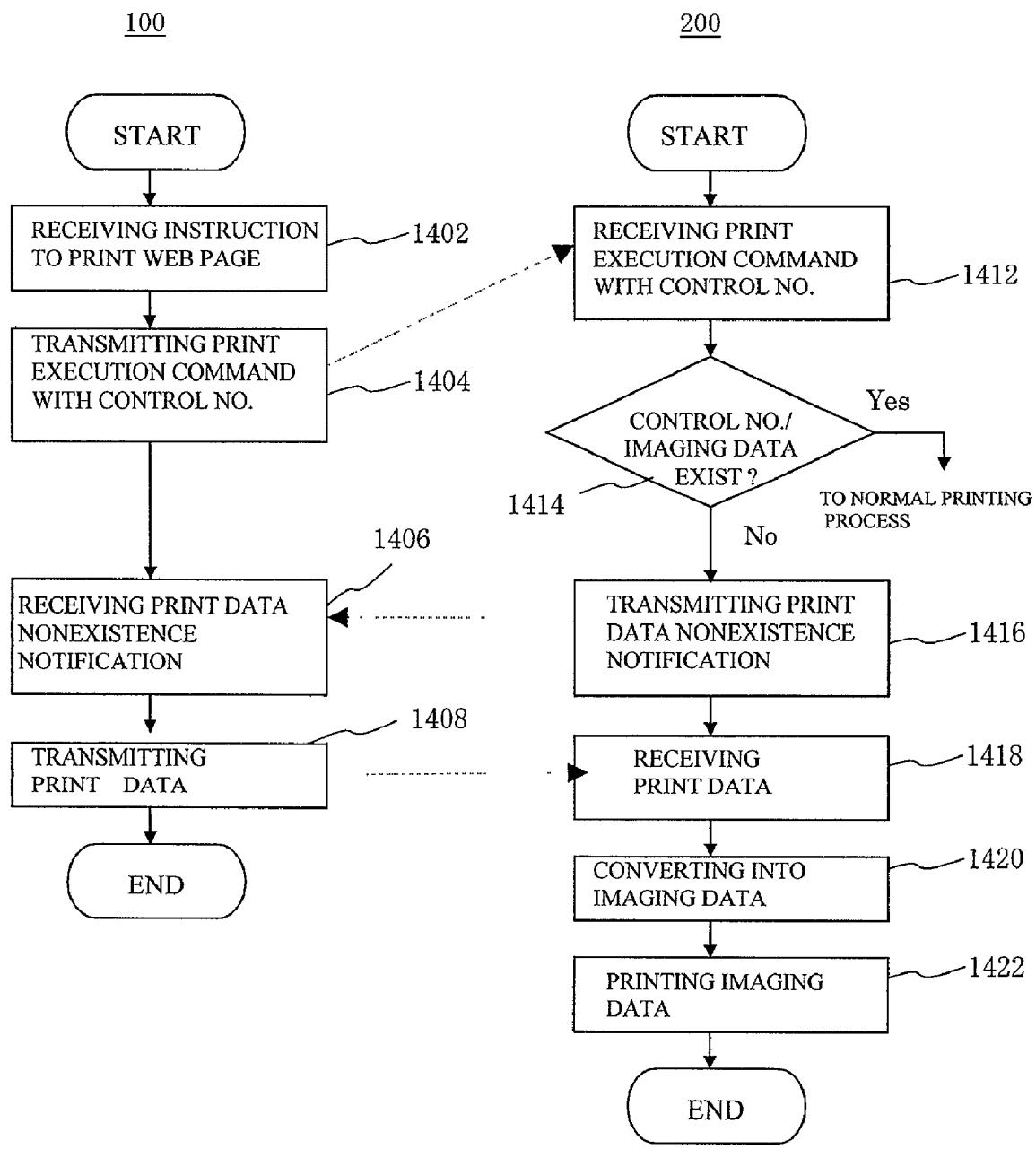
FIG. 13 is a flowchart for showing a second optional printing process step by step.

A description will now be given of optional printing processes that may be added to the first through third printing methods with reference to FIGS. 12 and 13. FIG. 12 is a flowchart for showing a first optional printing process step by step. FIG. 13 is a flowchart for showing a second optional printing process step by step.

The first optional printing process represents a process when the browsing user exits the WWW browser 170 on the PC 100. The PC 100 is instructed by the browsing user to exit the WWW browser 170 (step 1302), and thereafter transmit a clear command corresponding to every control number saved in the Web information storage area 160 to the printer 200 in the first place (step 1304). Then, the PC 100 clears the control numbers in the Web information storage area 160 (step 1306), and exits the WWW browser 170 (step 1308).

The printer 200, which receives a command for clearing the control numbers (step 1312), delete all the specified control numbers and imaging data corresponding to the pertinent control numbers from the Web information storage area 160 (step 1314).

According to the first optional printing process, when the WWW browser 170 exits, the Web page data and control numbers stored in the PC 100 and the printer 200 may automatically be cleared (deleted) at the same time. Therefore, it is possible to save browsing users from having to delete the data stored in the Web information storage area 160 and the print data storage area 250. It is also possible to prevent the Web information storage area 160 and the print data storage area 250 from becoming short of storage space due to accumulated Web page data, etc.

The second optional printing process exhibits a process when the print data storage area 250 has become short of available storage space. The printer 200 receives, and thereafter saves, the control number, Web page data (or Web page address), and print format information together with the imaging data that may be printed by the printer engine portion 280, and the control number, in the print data storage area 250. At that time, if the print data storage area 250 lacks in available storage space, for example, a process such as overwriting data from those to which the oldest control number is assigned in orderly sequence is required.

The PC 100 instructs to print the Web page (step 1402), and an execution command thereof is transmitted to the printer 200 (step 1404). Thereafter, the printer 200 receives the print execution command to which the control number is assigned (step 1412), and checks whether the control number and pertinent imaging data exist in the print data storage area 250 (step 1414). If the control number and imaging data exist, the imaging data is printed by the printer engine portion 280.

On the other hand, if the print data storage area 250 is short of available storage space, and the control number and imaging data do not exist, the printer 200 notifies the PC 100 of nonexistence of print data (step 1416). The PC 100 receives the print data nonexistence notification (step 1406), and immediately after that, transmits the print data (control number, Web page data or Web page address, and print format information) to the printer 200 (step 1408). When the printer 200 receives the print data (step 1418), converts the same into imaging data immediately (step 1420). Thereafter, the imaging data is not stored in the print data storage area 250, but transmitted directly to the printer engine portion 280, and printed (step 1422).

According to the second optional printing process, even if the print data storage area 250 is short of available storage space, the browsing user is not required to delete unnecessary data. Moreover, the user is not required to increase available storage space in the print data storage area 250 for fear of shortage of available storage space.

Figure 14:
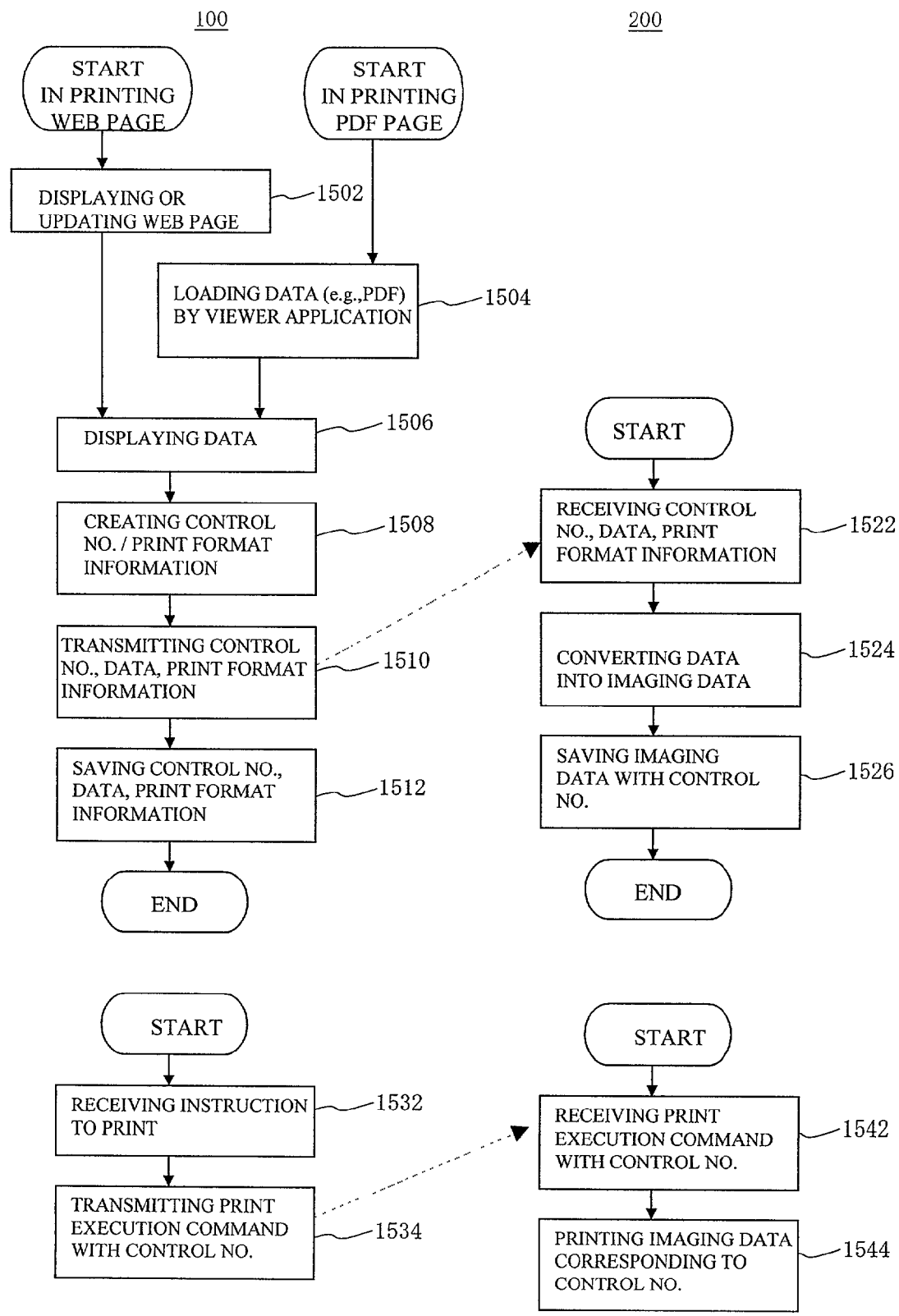
FIG. 14 is a flowchart for showing a fourth printing method step by step.
Figure 15:
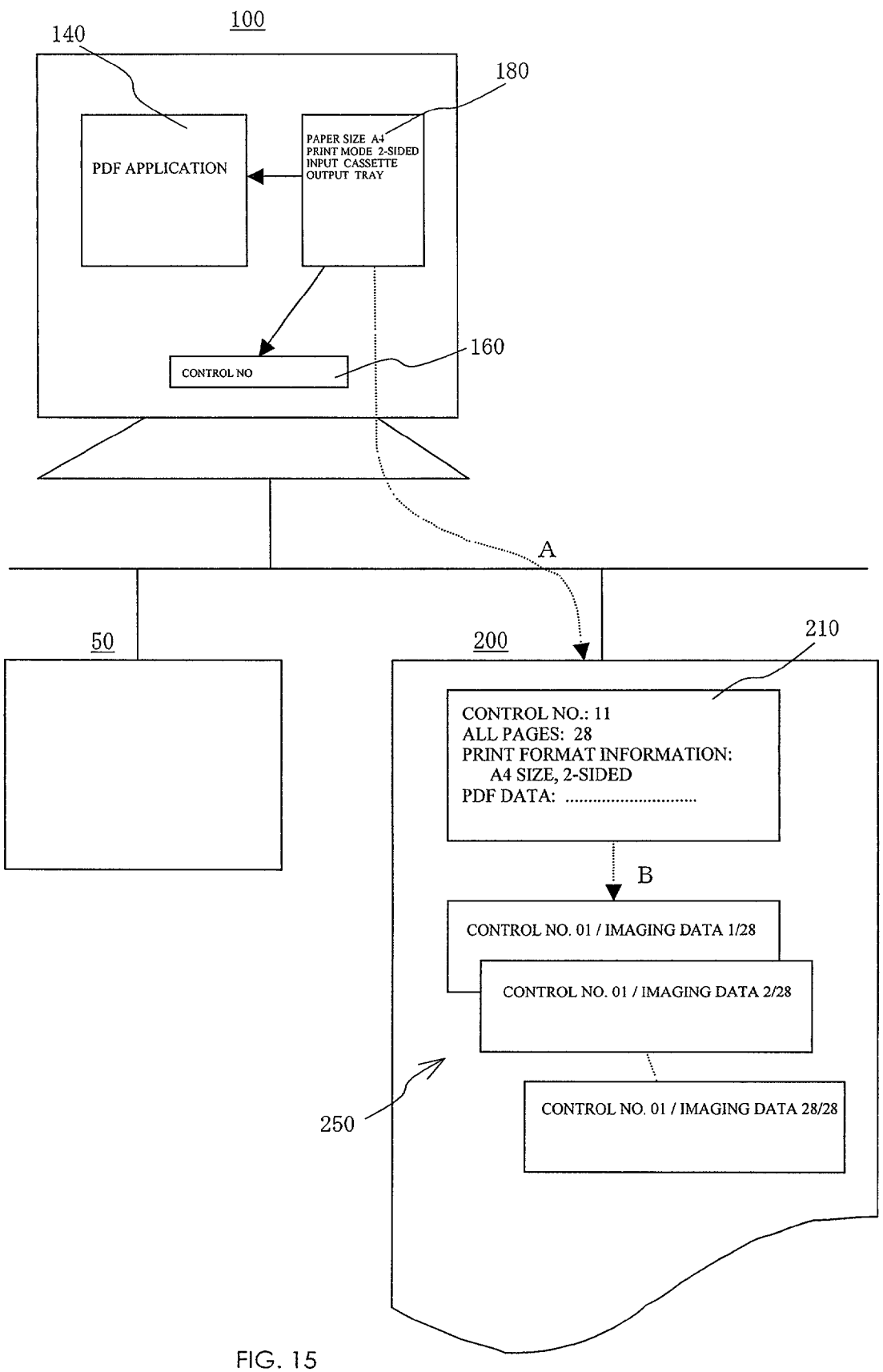
FIG. 15 is a block diagram for showing each data flow corresponding to the flowchart shown in FIG. 14.

The browsing user browses not only normal Web page information in the WWW browser 170, but also information displayed by an application designed specifically for displaying a specific data format file (e.g., viewer application for a PDF or other file formats). The printing method according to the present invention also serves to monitor the information of the application designed specifically for displaying a specific data format file. A description will be given of the printing method (fourth printing method) when the user browses a PDF file, with reference to FIGS. 14 and 15. FIG. 14 is a flowchart for showing the fourth printing method step by step. FIG. 15 is a block diagram for showing each data flow corresponding to the flowchart shown in FIG. 14.

When a user browsing Web pages wishes to display a new Web page or update (reload) a page currently displayed on the WWW browser 170, the PC 100 receives an instruction of display/update of the Web page (step 1502), and obtains a set of Web data constituting the Web page from the WWW server 50. On the other hand, the application designed specifically for displaying files in a specific data format typified by PDF is loaded in the WWW browser 170 through a viewer program stored in the HDD 140 (step 1504). Thereafter, the PC 100 displays the Web page or PDF file as intended on the monitor screen (step 1506).

When the Web page or PDF file is displayed in the PC 100, the monitoring program 180 creates a control number and print format information (as shown in FIG. 3) of the Web page or PDF file irrespective of whether the pertinent Web page or PDF file is to be printed or not (step 1508). Then, as indicated by an arrow A in FIG. 15, the monitoring program 180 transmits a set of data constituting the Web page or PDF file along with the created information to the printer 200 (step 1510). The control number, Web page or PDF file data, and print format information created and transmitted by the monitoring program 180 are saved and stored in the Web information storage area 160 (step 1512).

The above-described steps 1502 through 1512 are followed every time when information to be displayed in the Web page or PDF file should be updated for displaying a new Web page or reloading (updating) the same Web page. The control number may be a unique number such as a combination of a MAC address (or IP address) with a sequential number, so that overlap of the control number may be avoided even when the printer 200 is shared in a multi-host environment.

The printer 200 first receives the control number, Web page or PDF file data, and print format information transmitted from the PC 100 in step 1510 (step 1522). Thereafter, the CPU 210 mounted in the printer 200 analyzes the Web page or PDF file data based upon the print format information, and converts in advance the data into imaging data that the printer engine portion 280 may print, as indicated by an arrow B in FIG. 15 (step 1524). Then the control number and imaging data are saved and stored in the print data storage area 250 (step 1526).

When the user browsing Web pages wishes to print a Web page or PDF file, the user presses the print button 185 in the monitoring screen 180a in FIG. 3, and instructs the PC 100 to print (step 1532). Thereafter, the PC 100 in response to the print instruction transmits a print execution command with the control number to the printer 200 (step 1534). In this stage, the printer 200 has already received and converted the print data for the Web page or PDF file to be printed when receiving the print instruction from the user in step 1532, and thus the PC 100 need not redundantly transmit the print data.

When the printer 200 receives the print execution command with the control number from the PC 100 (step 1542), the CPU 210 in the printer 200 picks up a set of converted imaging data corresponding to the control number from the print data storage area 250, and transmits the same to the printer engine portion 280. Then, the printing is initiated (step 1544). Although a description has been given of the PDF file data in the present embodiment, those data other than in PDF format which are viewed with MS-Word or the like may be printed through the same process as well.

According to the fourth printing method in the present invention, the PC 100 transmits PDF file data to the printer 200 irrespective of whether the PDF file is to be printed or not, and the printer 200 stores the pertinent PDF file data as printable imaging data. Therefore, when the PC 100 transmits a print command for a PDF file as specified, the printer 200 initiates printing without keeping a browsing user waiting, and thus a printed matter as desired may be obtained in a short time after the print command transmittal. Moreover, the fourth printing method may further include the above-described first optional printing process or second optional printing process.

Figure 16:
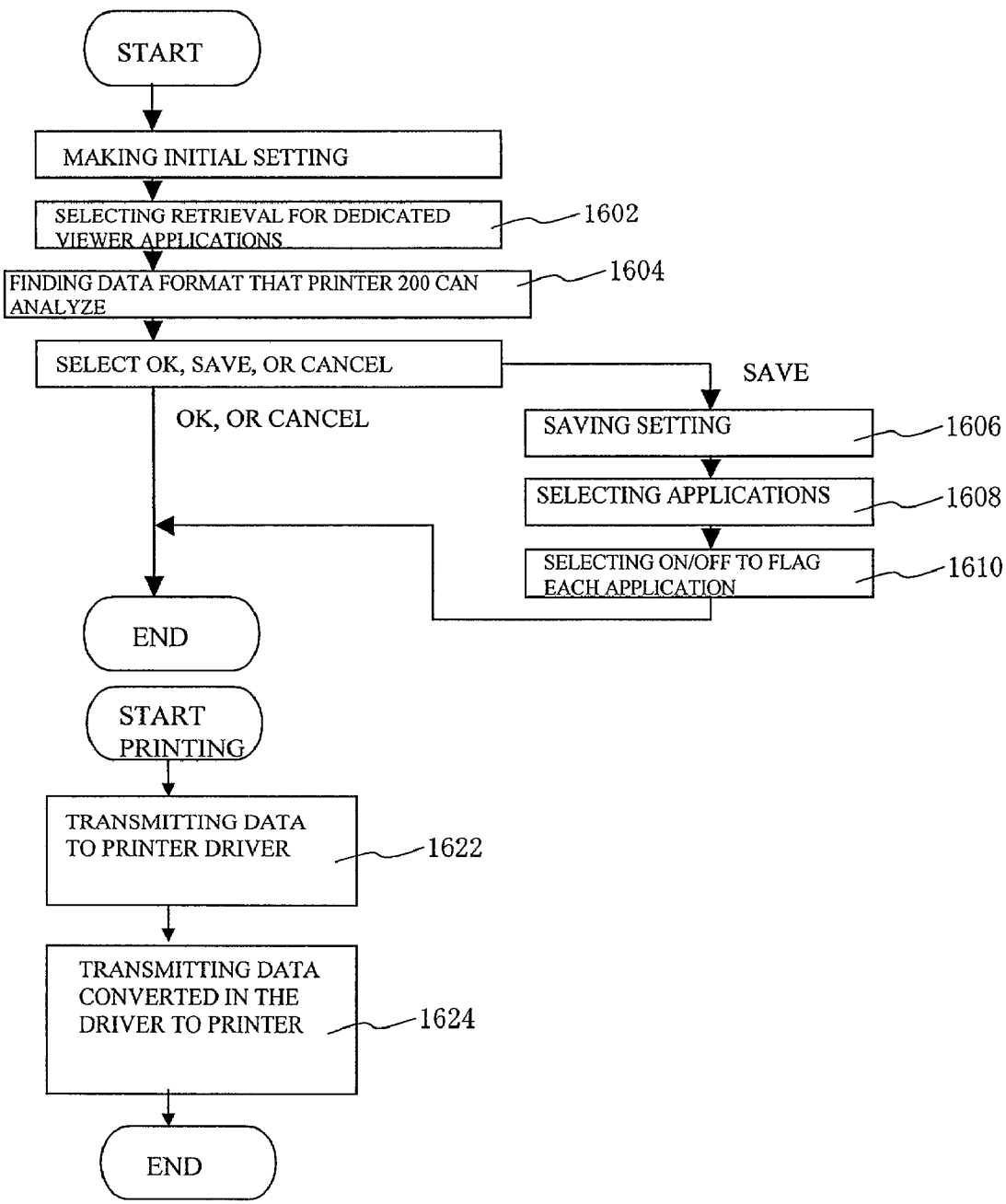
FIG. 16 is a flowchart for showing a third optional printing process step by step.
Figure 17:
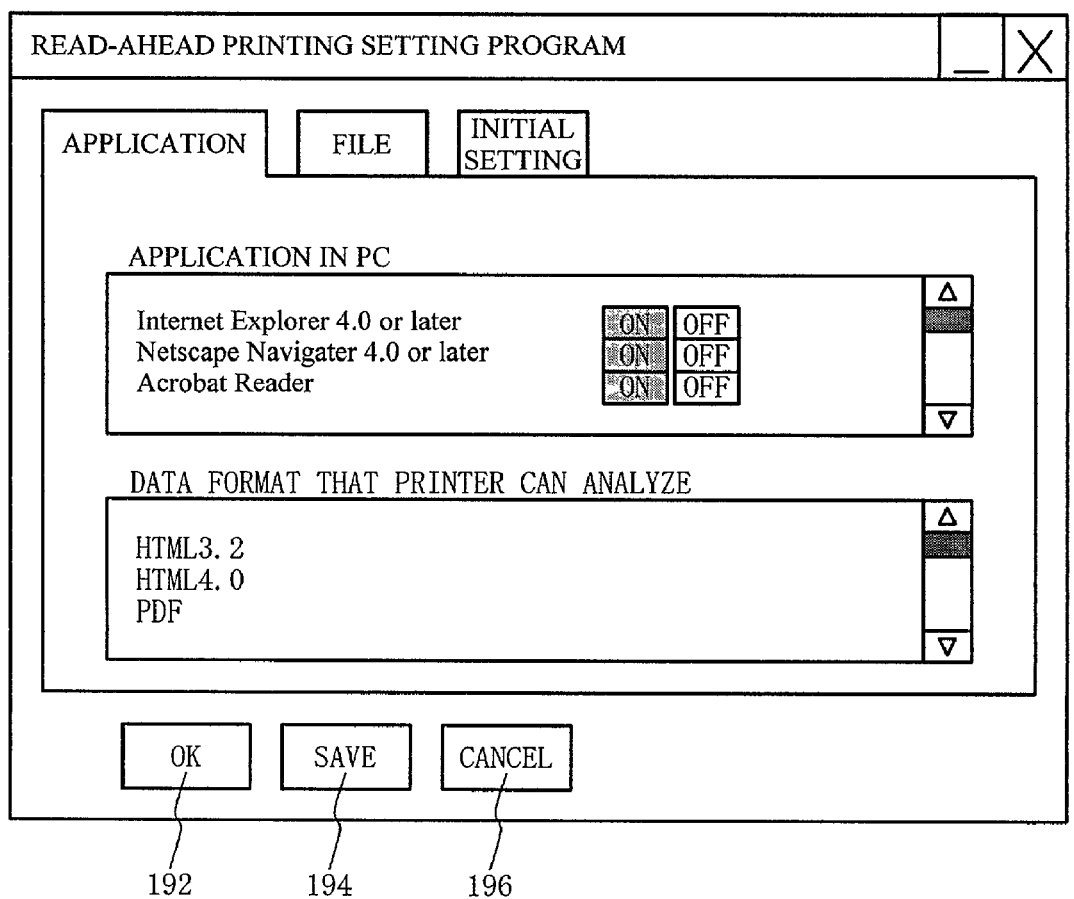
FIG. 17 is an exemplified overview for showing a display screen of a read-ahead setting program that launches in the printing method shown in FIG. 16.
Figure 18:
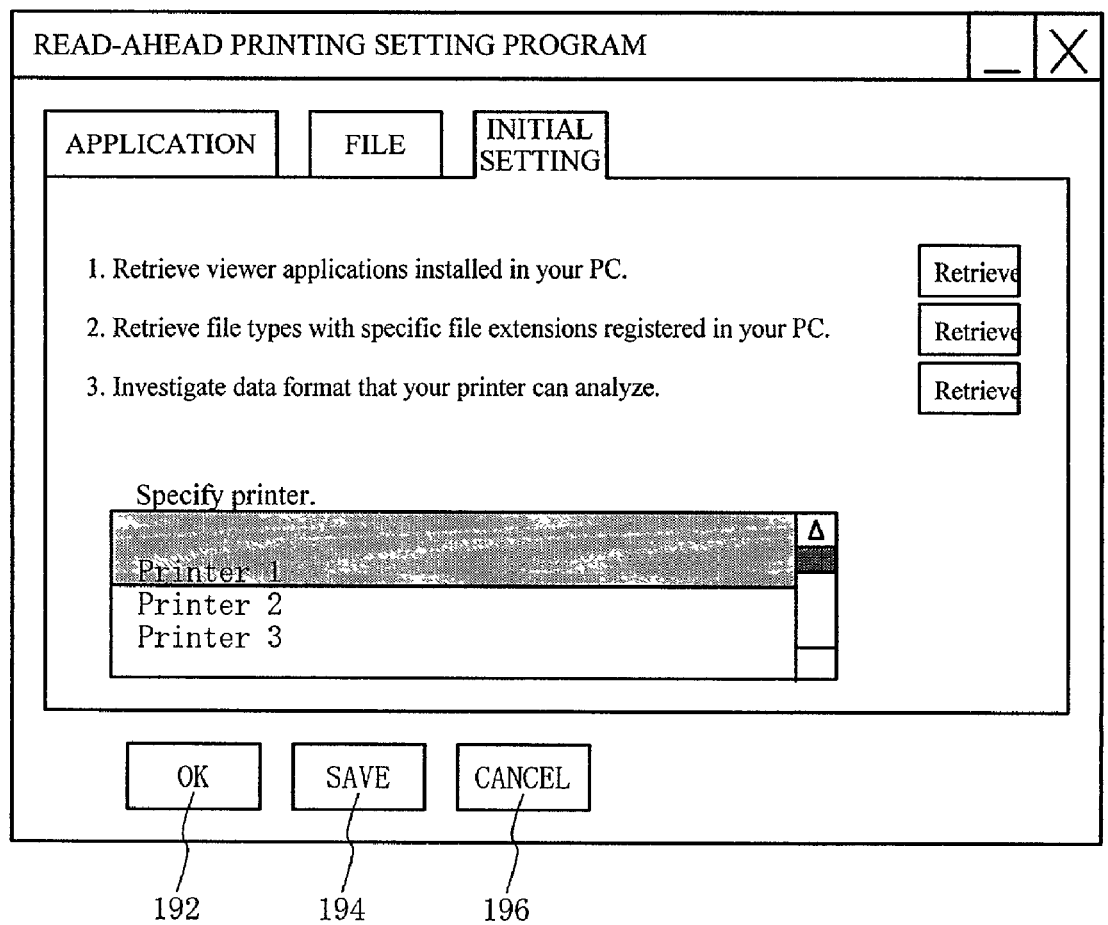
FIG. 18 is an exemplified overview for showing an initial setting screen of the read-ahead setting program shown in FIG. 17.
Figure 19:
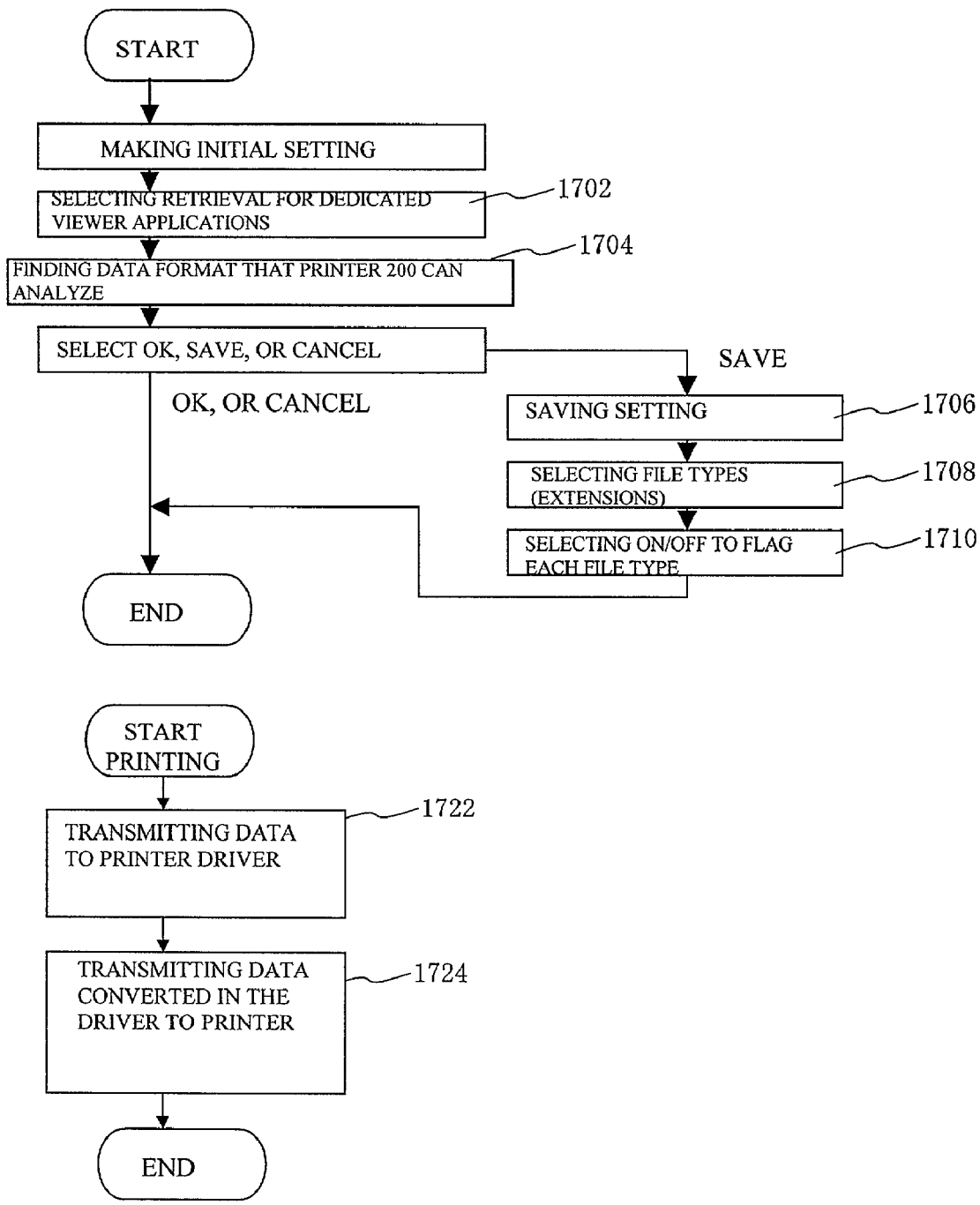
FIG. 19 is a flowchart for showing a fourth optional printing process step by step.
Figure 20:
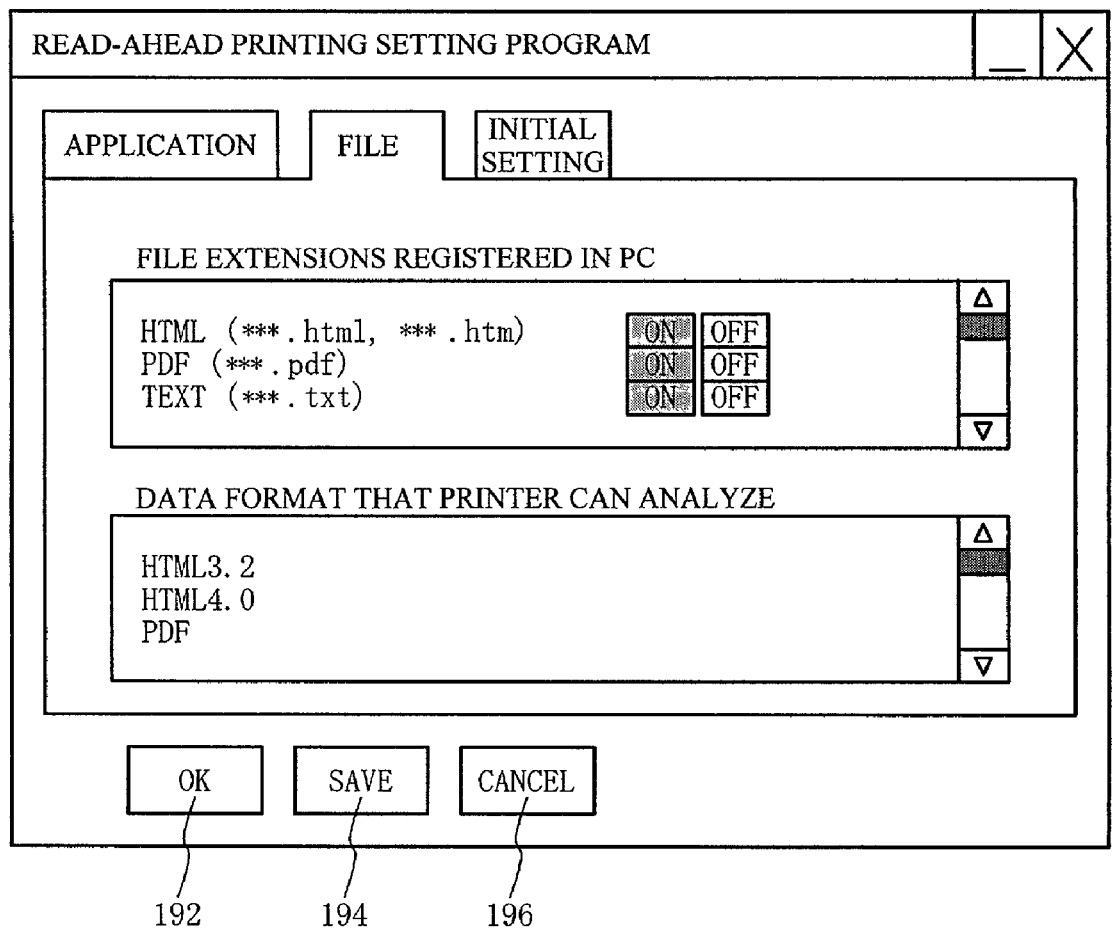
FIG. 20 is an exemplified overview for showing a display screen of a read-ahead setting program that launches in the printing method shown in FIG. 19.

A description will now be given of optional printing processes that may be added to the fourth printing method, with reference to FIGS. 16 through 20. FIG. 16 is a flowchart for showing the third optional printing process step by step. FIG. 17 is an exemplified overview for showing a display screen 190a of a read-ahead setting program 190 that launches in the printing method shown in FIG. 16. FIG. 18 is an exemplified overview for showing an initial setting screen 190b of the read-ahead setting program 190 shown in FIG. 17. FIG. 19 is a flowchart for showing the fourth optional printing process step by step. FIG. 20 is an exemplified overview for showing a display screen 190c of the read-ahead setting program 190 that launches in the printing method shown in FIG. 19.

In the third optional printing process, a read-ahead printing may be selected according to the kind of applications executable on the PC 100, such as the WWW browser 170 and the application designed specifically for displaying files in a specific data format (e.g., PDF). FIG. 17 shows the display screen 190a for setting a program to be selected for each kind of the applications. In a lower portion of the display screen 190a are provided an OK button 192, a SAVE button 194, a CANCEL button 196. Each button has a respective function: the OK button 192 serves to exit the read-ahead program, the SAVE button 194 to save changed setting information, and the CANCEL button 196 to discard the changed setting information and exit the read-ahead program.

The read-ahead setting program 190 first makes an initial setting as shown in FIG. 18. With the display screen 190b as shown in FIG. 18, an initial setting tab is selected so that applications installed in the PC 100 and functions of printer 200 may be retrieved in the following steps. A retrieval button for applications in the PC 100 is pressed, to automatically retrieve applications designed specifically for displaying a specific data format file (step 1602). Then, a retrieval button for data formats the printer 200 can analyze, to obtain information on data formats the printer 200 can analyze (step 1604). At that time, the printer 200 automatically responds to a request. A button as desired is selected among the OK button 192, the SAVE button 194, and the CANCEL button 196, and the initial setting is completed. If the SAVE button 196 is pressed then, each item retrieved in the steps 1602 and 1604 are entered and saved (step 1606).

Thereafter, an application-specific list tab is selected, and the display screen 190a as shown in FIG. 17 is displayed (step 1608). The displayed contents are information retrieved in the above initial setting. A user (browsing person) may select ON/OFF of the read-ahead printing from one application to another application (step 1610), and the setting is stored in the RAM 130 in the PC 100.

If the read-ahead printing is set at OFF, the PC 100 transmits the Web page data to a printer driver when instructed to print the same (step 1622). The Web page data is converted in the printer driver and transmitted to the printer 200 (step 1624), so that the printer 200 initiates printing. In other words, a normal printing operation through the printer driver is carried out.

In the fourth optional printing process, a read-ahead printing may be selected among programs according to the kind of files (e.g., that which is specified by a filename extension as a plain txt format specified by ***.txt) displayed on the PC 100 by the programs. FIG. 20 shows the display screen 190c for setting a program to be selected for each kind of file formats. In a lower portion of the display screen 190c are provided an OK button 192, a SAVE button 194, a CANCEL button 196, each having the above-mentioned function.

An initial setting should also be made in the fourth optional printing process, but is followed by the same steps as the third optional printing process, and thus a detailed description will be omitted herein of steps 1702 and 1704. After these steps, a button as desired is selected among the OK button 192, the SAVE button 194, and the CANCEL button 196, and the initial setting is completed. If the SAVE button 196 is pressed then, each item retrieved in the steps 1702 and 1704 are entered and saved (step 1706).

Thereafter, a file (format)-specific list tab is selected, and the display screen 190c as shown in FIG. 20 is displayed (step 1608). The displayed contents are information retrieved in the previous initial setting. A user (browsing person) may select ON/OFF of the read-ahead printing from one file format to another file format (step 1610), and the setting is stored in the RAM 130 in the PC 100.

If the read-ahead printing is set at OFF, the PC 100 transmits the Web page data to a printer driver when instructed to print the same (step 1722). The Web page data is converted in the printer driver and transmitted to the printer 200 (step 1724), so that the printer 200 initiates printing. In other words, a normal printing operation through the printer driver is carried out as in the third optional printing process.

According to the third optional printing process and the fourth optional printing process, the setting as to whether the read-ahead printing is carried out or not may be made according to the kind of applications or file formats. Accordingly, the read-ahead printing may be carried out selectively, according to the distinction of the applications or file formats, only for the Web page that needs more than a specified time period to obtain a desired print output with the normal printing operation through a printer driver. To be more specific, every Web page may be printed through the read-ahead printing process or normal printing process, and the discrimination thereof may be set arbitrarily by the user (browsing person).

Although the preferred embodiments of the present invention have been described above, it is to be understood that various modifications and changes may be made without departing from the spirit and scope thereof. For instance, as a printer for the inventive printing system, a line printer, a serial printer or other printers other than a page printer may be used.

According to the printing system and printing method using the printing system as one exemplified embodiment of the present invention, a PC transmits a Web page data irrespective of whether the pertinent page is to be printed or not, and a printer stores the pertinent Web page data as printable imaging data. Therefore, when the PC transmits a print command for a Web page as specified, the printer initiates printing without keeping a browsing user waiting, and thus a printed output as desired may be obtained in a short time after the print command transmittal. In short, the inventive printing system that prints a Web page may initiate printing without long wait after the print command is transmitted. Accordingly, communications costs during the wait for printing that would be required to maintain the state of continuous connection with the Internet would be no more required, thereby making a cost reduction possible.

What is claimed is:

1. A printing method comprising:
    creating a print control number and print format information of a Web page at a computer, the Web page being provided from a WWW server, and the computer having a WWW browser, the Web page being viewed and monitored;
    transmitting print information having the print control number and the print format information to a printer;
    converting data of the Web page into imaging data at the printer;
    storing the print information and the image data being connected to each other in a memory of the printer, the image data being specified by the print control number; and
    printing the image data stored in the memory of the printer by executing a print command from the computer, the image data being specified by the print control number.

2. A printing method according to claim 1, wherein the print information includes an address of the Web page, and the printer accesses the Web page and obtains the data of the Web page.

3. A printing method according to claim 1, further comprising:
    judging whether the data of the Web page being updated or not; and
    notifying a result of the judging to a user.

4. A printing method according to claim 1, further comprising deleting the print information and the image data stored in the memory of the printer, when the WWW browser is closed.

5. A printing method according to claim 1, further comprising receiving the data of the Web page when the imaging data corresponding to the print execution command is not stored in the memory.

6. A computer comprising:
    a memory including a WWW browser and a monitoring program; and
    a control portion that is connected with the memory and operates according to the monitoring program,
    wherein the monitoring program simultaneously starts operation with a launching of the WWW browser;
    wherein the monitoring program monitors a Web page, and creates a print control number and print format information of the Web page; and
    wherein the control portion transmits print information including the print control number and the print format information created by the monitoring program to a printer connected with the computer.

7. A printing system comprising a computer, a printer, and a network that connects the computer and the printer,
    wherein the computer comprises:
    a memory including a WWW browser and a monitoring program; and
    a control portion that is connected with the memory and operates according to the monitoring program,
    wherein the monitoring program simultaneously starts operation with a launching of the WWW browser;
    wherein the monitoring program monitors a Web page, and creates a print control number and print format information of the Web page; and
    wherein the control portion transmits print information including the print control number and the print format information created by the monitoring program to a printer connected with the computer, and
    wherein the printer comprises:
    a control portion that accesses a Web page based upon an address of the Web page that is provided from outside, obtains data, and converts the data into imaging data;
    a memory that stores the imaging data; and
    an image-forming portion that prints the imaging data in response to a print execution command that is provided from outside and specifies the imaging data.

8. A printing method according to claim 1, further comprising creating the print control number and the print format information of a file displayed on the WWW browser by an application that is designed specifically for displaying the file and installed in the computer.

9. A printing method according to claim 8, wherein application-to-application configuration as to whether to carry out a read-ahead printing is possible.

10. A printing method according to claim 8, wherein configuration as to whether to carry out a read-ahead printing may be made for each file that the application opens.

11. A storage medium readable by a computer, the storage medium storing a program of instructions executable by the computer to perform a function for printing, the function comprising:
    creating a print control number and print format information of a Web page that is provided from a WWW server, wherein the computer including a WWW browser through which the Web page is viewed and monitored;

the computer transmitting to a printer connected to the computer print information that includes the print control number and the print format information;

the printer converting data of the Web page into imaging data;

the printer storing the print control number and the imaging data in a memory in the printer; and in response to a print execution command from the computer, the printer printing specific imaging data corresponding to a specific print control number, wherein the specific imaging data is specified by the print execution command among the imaging data stored in the memory.

12. A printing method according to claim 1, wherein the image data to be printed is specified with the print control number from the computer or by inputting the print control number into the printer directly.

13. A printing method according to claim 1, wherein the print format information can be changed by a user before the image data is printed.

14. A printing method comprising:

creating a print control number and print format information of a Web page at a computer, the Web page being provided from a WWW server and the computer having a WWW browser, the Web page is viewed by a user;

monitoring the Web page;

transmitting print information having the print control number and the print format information to a printer;

previously converting data of the Web page into imaging data at the printer; and storing the print information and the image data being connected to each other in a memory of the printer, the image data being specified by the print control number, printing the image data stored in the memory of the printer by executing a print command from the computer, the image data being specified by the print control number, wherein a process of monitoring starts with a launching of the WWW browser.

* * * * *